(12) United States Patent
Kim et al.

(10) Patent No.: US 12,037,278 B2
(45) Date of Patent: Jul. 16, 2024

(54) WINDOW MOLDING APPARATUS AND WINDOW MOLDING METHOD USING THE SAME

(71) Applicant: SAMSUNG DISPLAY CO., LTD., Yongin-si (KR)

(72) Inventors: Seung Kim, Seongnam-si (KR); Byunghoon Kang, Hwaseong-si (KR); Kyungrok Ko, Suwon-si (KR); Seungho Kim, Anyang-si (KR); Young-Seok Seo, Seoul (KR); Gyuin Shim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 161 days.

(21) Appl. No.: 17/404,926

(22) Filed: Aug. 17, 2021

(65) Prior Publication Data
US 2022/0135462 A1    May 5, 2022

(30) Foreign Application Priority Data
Nov. 4, 2020    (KR) .......................... 10-2020-0145775

(51) Int. Cl.
*C03B 23/03*    (2006.01)
(52) U.S. Cl.
CPC ...... *C03B 23/0302* (2013.01); *C03B 23/0307* (2013.01)
(58) Field of Classification Search
None
See application file for complete search history.

(56) References Cited

U.S. PATENT DOCUMENTS

| | | | |
|---|---|---|---|
| 8,136,371 | B2 | 3/2012 | Kato et al. |
| 8,256,244 | B2 * | 9/2012 | Imaichi ............... C03B 35/202 65/106 |
| 8,665,236 | B2 | 3/2014 | Myers |
| 9,299,869 | B2 | 3/2016 | Murata |
| 10,162,386 | B2 | 12/2018 | Chong et al. |
| 10,224,502 | B2 | 3/2019 | Cho et al. |
| 10,759,689 | B2 | 9/2020 | Chau et al. |

(Continued)

FOREIGN PATENT DOCUMENTS

| | | |
|---|---|---|
| KR | 10-1145748 | 5/2012 |
| KR | 10-1163568 | 7/2012 |

(Continued)

*Primary Examiner* — Jodi C Franklin
(74) *Attorney, Agent, or Firm* — CANTOR COLBURN LLP

(57) ABSTRACT

Provided is a window molding apparatus including an inner molding part including a core molding part, which includes a plurality of sub-bottom surfaces having different curvature radii, and a flat molding part spaced apart from the sub-bottom surfaces and disposed on the core molding part, and an outer molding part which is disposed below the inner molding part with a member to be processed therebetween and in which a groove corresponding to the core molding part is defined. The outer molding part includes a lower surface, an upper surface configured to face the lower surface, and a plurality of sub-groove surfaces having different curvature radii that define the groove to provide a window including sub-bent portions having different curvature radii.

12 Claims, 29 Drawing Sheets

(56) References Cited

U.S. PATENT DOCUMENTS

| | | |
|---|---|---|
| 10,847,406 B2 | 12/2020 | Son et al. |
| 2006/0006558 A1* | 1/2006 | Yamada ............... B29C 33/0038 425/408 |
| 2009/0039556 A1* | 2/2009 | Sawada .................. B29C 51/14 425/347 |
| 2011/0014475 A1 | 1/2011 | Murata |
| 2012/0144866 A1* | 6/2012 | Liu ..................... C03B 23/0357 65/106 |
| 2013/0337224 A1* | 12/2013 | Odani ................... C03B 23/0066 428/130 |
| 2014/0075996 A1* | 3/2014 | Dannoux ............ C03B 23/0256 65/273 |
| 2014/0373573 A1* | 12/2014 | Hwang ................. C03B 35/202 65/157 |
| 2015/0000339 A1* | 1/2015 | Jang .................... C03B 23/0305 65/106 |
| 2015/0000340 A1* | 1/2015 | Jang .................... C03B 23/0305 65/106 |
| 2015/0315058 A1* | 11/2015 | Ota ..................... C03B 27/0404 65/268 |
| 2015/0353410 A1* | 12/2015 | Funatsu .................. C03B 11/08 65/106 |
| 2016/0016845 A1 | 1/2016 | Cho et al. |
| 2016/0174423 A1* | 6/2016 | Oh ....................... G02F 1/1333 445/25 |
| 2017/0057858 A1* | 3/2017 | Jeon ........................ C03B 23/03 |
| 2017/0121210 A1 | 5/2017 | Rai et al. |
| 2018/0022630 A1* | 1/2018 | Fukushi .............. C03B 23/0252 65/30.14 |
| 2018/0037486 A1* | 2/2018 | Liu ........................ C03C 21/002 |
| 2019/0071343 A1* | 3/2019 | Kanasugi ............ C03B 23/0302 |
| 2019/0135677 A1* | 5/2019 | Fukushi ................. C03C 3/087 |
| 2019/0187757 A1 | 6/2019 | Choi et al. |
| 2019/0248692 A1 | 8/2019 | Hwang et al. |
| 2019/0361286 A1 | 11/2019 | Jang |
| 2020/0062632 A1* | 2/2020 | Brennan ........... B32B 17/10091 |
| 2020/0165152 A1* | 5/2020 | Dan .................... C03B 23/0302 |
| 2020/0180991 A1* | 6/2020 | Boek ........................ B32B 3/28 |
| 2021/0139362 A1* | 5/2021 | Nozaki ..................... C03C 3/087 |
| 2021/0206684 A1* | 7/2021 | Nozaki ..................... C03B 23/03 |
| 2021/0387891 A1* | 12/2021 | Kim ...................... C03B 23/0307 |
| 2022/0238953 A1* | 7/2022 | Zou ...................... C03B 23/0357 |

FOREIGN PATENT DOCUMENTS

| | | |
|---|---|---|
| KR | 10-1218650 | 1/2013 |
| KR | 10-1336936 | 12/2013 |
| KR | 10-2014-0067788 | 6/2014 |
| KR | 10-1465423 | 11/2014 |
| KR | 10-2015-0001964 | 1/2015 |
| KR | 10-2015-0005098 | 1/2015 |
| KR | 10-1585633 | 1/2016 |
| KR | 10-1597526 | 2/2016 |
| KR | 10-1638579 | 7/2016 |
| KR | 10-2018-0074780 | 10/2016 |
| KR | 10-2017-0005281 | 1/2017 |
| KR | 10-1721082 | 3/2017 |
| KR | 10-2017-0040433 | 4/2017 |
| KR | 10-2017-0106552 | 9/2017 |
| KR | 10-2017-0123978 | 11/2017 |
| KR | 10-2017-0125806 | 11/2017 |
| KR | 10-1804393 | 12/2017 |
| KR | 10-2018-0038610 | 4/2018 |
| KR | 10-2018-0076419 | 7/2018 |
| KR | 10-1893830 | 8/2018 |
| KR | 10-1892388 | 9/2018 |
| KR | 10-1904825 | 10/2018 |
| KR | 10-2019-0071854 | 6/2019 |
| KR | 10-2019-0094498 | 8/2019 |
| KR | 10-2019-0098284 | 8/2019 |
| KR | 10-2019-0134949 | 12/2019 |
| KR | 10-2021-0155437 | 12/2021 |

* cited by examiner

WINDOW MOLDING APPARATUS AND WINDOW MOLDING METHOD USING THE SAME

CROSS-REFERENCE TO RELATED APPLICATION

This application claims priority from and the benefit of Korean Patent Application No. 10-2020-0145775, filed on Nov. 4, 2020, which is hereby incorporated by reference for all purposes as if fully set forth herein.

BACKGROUND

Field

Embodiments of the invention relate generally to a window molding apparatus and a window molding method using the same, and more particularly, to a window molding apparatus for manufacturing a window having a bent portion that is bent at a large bending angle and a window molding method.

Discussion of the Background

An electronic device includes a window, a housing, and electronic elements. The electronic elements include various elements that are activated according to an electrical signal such as a display element, a touch element, or a detection element. The window protects the electronic elements and provides an active area to a user. Thus, the user may provide an input to the electronic elements or receive information generated in the electronic elements through the window. In addition, the electronic elements may be stably protected against external impacts through the window.

Recently, a curved display device or bent display device, which displays an image through each of a front surface, a rear surface, side surfaces has been developed, and it is necessary to develop a window processing technology having various shapes, which is capable of being used for various types of display devices.

The above information disclosed in this Background section is only for understanding of the background of the inventive concepts, and, therefore, it may contain information that does not constitute prior art.

SUMMARY

The inventive concepts provide a window molding apparatus for manufacturing a window having a bent portion, which is bent at a large angle and includes sub-bent portions having curvature radii different from each other.

The inventive concepts also provides a window molding method for easily processing a window having a bent portion including sub-bent portions having curvature radii different from each other.

Additional features of the inventive concepts will be set forth in the description which follows, and in part will be apparent from the description, or may be learned by practice of the inventive concepts.

An embodiment of the inventive concept provides a window molding apparatus including: an inner molding part including a core molding part, which includes a plurality of sub-bottom surfaces having different curvature radii, and a flat molding part spaced apart from the sub-bottom surfaces and disposed on the core molding part; and an outer molding part which is disposed below the inner molding part with a member to be processed therebetween and in which a groove corresponding to the core molding part is defined, wherein the outer molding part includes: a lower surface; an upper surface facing the lower surface; and a plurality of sub-groove surfaces having different curvature radii that define the groove.

In an embodiment, the sub-bottom surfaces may include a first sub-bottom surface and a second sub-bottom surface having a curvature radius less than that of the first sub-bottom surface, and the sub-groove surfaces may include a first sub-groove surface corresponding to the first sub-bottom surface and a second sub-groove surface corresponding to the second sub-bottom surface and having a curvature radius less than that of the first sub-groove surface.

In an embodiment, the first sub-groove surface may be adjacent to the lower surface, and the second sub-groove surface may be adjacent to the first sub-groove surface and extends from the lower surface toward the upper surface.

In an embodiment, the first sub-groove surface may have a curvature radius greater than that of the first sub-bottom surface, and the second sub-groove surface may have a curvature radius greater than that of the second sub-bottom surface.

In an embodiment, the first sub-groove surface may include a flat surface, and the second sub-groove surface may include a curved surface having a first curvature radius with respect to a curvature center defined inside the groove.

In an embodiment, the first sub-bottom surface may include a flat surface, and the second sub-bottom surface may include a curved surface having a second curvature radius corresponding to the second sub-groove surface.

In an embodiment, the member to be processed may include a bent portion bent with respect to a bending axis extending in a first direction and first and second non-bent portions respectively disposed at both sides of the bent portion with the bent portion therebetween, wherein the bent portion may include a first sub-bent portion corresponding to the first sub-groove surface and the first sub-bottom surface and a second sub-bent portion corresponding to the second sub-groove surface and the second sub-bottom surface.

In an embodiment, the second sub-bent portion may have a curvature radius less than that of the first sub-bent portion.

In an embodiment, the first sub-bent portion may include a flat surface, and the second sub-bent portion may include a curved surface having a curvature radius of about 4 mm or less.

In an embodiment, in a state in which the core molding part and the member to be processed are inserted into the groove, the first non-bent portion and the second non-bent portion may face each other with the flat molding part therebetween.

In an embodiment, in a cross-section perpendicular to the lower surface, a width of the core molding part in a second direction may be greater than that of the flat molding part in the second direction, and wherein the second direction may be a direction perpendicular to the first direction.

In an embodiment, the member to be processed may include an inner surface adjacent to the inner molding part and an outer surface configured to face the inner surface and adjacent to the outer molding part, wherein an edge portion of the member to be processed may be bent toward the inner surface.

In an embodiment, the groove may include: a lower groove portion defined by the first sub-groove surface and the second sub-groove surface; and a plurality of sub-cavities, which extends from the lower groove portion toward the upper surface, and each of which is defined to have a curved surface.

In an embodiment, the outer molding part may further include a plurality of movable molds respectively disposed on the sub-cavities to move along the curved surfaces of the sub-cavities.

In an embodiment, in a cross-section perpendicular to the lower surface, each of the movable molds may include a curved mold part having a curved surface corresponding to the curved surface of each of the sub-cavities and a flat mold part configured to face the curved mold part.

In an embodiment, the window molding apparatus may further include a base jig on which the outer molding part is disposed, wherein the base jig may include a bottom surface and a plurality of side surfaces including a support portion on which the member to be processed is seated.

In an embodiment, a notch corresponding to the core molding part may be defined in at least one of the plurality of side surfaces.

In an embodiment of the inventive concept, a window molding method using a window molding apparatus, which includes: an inner molding part including a core molding part, which includes a plurality of sub-bottom surfaces having different curvature radii, and a flat molding part spaced apart from the sub-bottom surfaces and disposed on the core molding part; and an outer molding part which is disposed below the inner molding part with a member to be processed therebetween and in which a groove corresponding to the core molding part is defined.

In an embodiment, the window molding method includes: providing a member to be processed between the inner molding part and the outer molding part; and molding the member to be processed so that the member to be processed includes a bent portion that is bent along shapes of the groove and the core molding part, wherein the molding of the member to be processed includes: providing heat to the member to be processed; and bending the member to be processed so that the bent portion of the member to be processed includes first and second sub-bent portions having different curvature radii and first and second non-bent portions facing each other with the bent portion therebetween.

In an embodiment, the sub-bottom surfaces may include a first sub-bottom surface and a second sub-bottom surface having a curvature radius less than that of the first sub-bottom surface, and the sub-groove surfaces may include a first sub-groove surface corresponding to the first sub-bottom surface and a second sub-groove surface corresponding to the second sub-bottom surface and having a curvature radius less than that of the first sub-groove surface, wherein the bending of the member to be processed may include allowing the inner molding part to move into the groove so that the first sub-bottom surface and the first sub-groove surface correspond to each other with the member to be processed therebetween, and the second sub-bottom surface and the second sub-groove surface correspond to each other with the member to be processed therebetween.

In an embodiment, the molding of the member to be processed may include removing the inner molding part moving into the groove through a front or rear surface of the window molding apparatus, which is perpendicular to the moving direction of the inner molding part.

In an embodiment, the bending of the member to be processed may include molding the bent portion of the member to be processed so that the first sub-bent portion may include a flat surface, and the second sub-bent portion may include a curved surface having a curvature radius of about 4 mm or less.

In an embodiment, the member to be processed may include a glass substrate, and in the providing of the heat to the processed member, the heat may be provided to at least one of the inner molding part or the outer molding part to reduce viscosity of the member to be processed to about $10^7$ poises to about $10^9$ poises.

In an embodiment, the window molding method may further include, before the providing of the member to be processed, molding an edge of the member to be processed so that the member to be processed includes a bent edge portion.

In an embodiment, the outer molding part may include a lower surface, an upper surface facing the lower surface, and first and second sub-groove surfaces having different curvature radii that define the groove, the groove may include: a lower groove portion defined by a first sub-groove surface and a second sub-groove surface, which have different curvature radii; and a plurality of sub-cavities, which extends from the lower groove portion toward the upper surface, and each of which is defined to have a curved surface, and the outer molding part may further include a plurality of movable molds respectively disposed on the sub-cavities to move along the curved surfaces of the sub-cavities, wherein the bending of the member to be processed may include allowing the inner molding part to move so that the core molding part and the lower groove portion correspond to each other with the member to be processed therebetween.

In an embodiment, each of the movable molds may include a curved mold part having a curved surface corresponding to the curved surface of each of the sub-cavities and a flat mold part facing the curved mold part, in the disposing of the member to be processed, the flat mold parts of the adjacent movable molds may be disposed adjacent to each other below the member to be processed and arranged parallel to each other, and in the bending of the member to be processed, the flat mold parts of the adjacent movable molds may be spaced apart from each other to face each other with the member to be processed therebetween.

In an embodiment, the window molding method may further include, after the molding of the member to be processed, chemically strengthening the member to be processed.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1A:
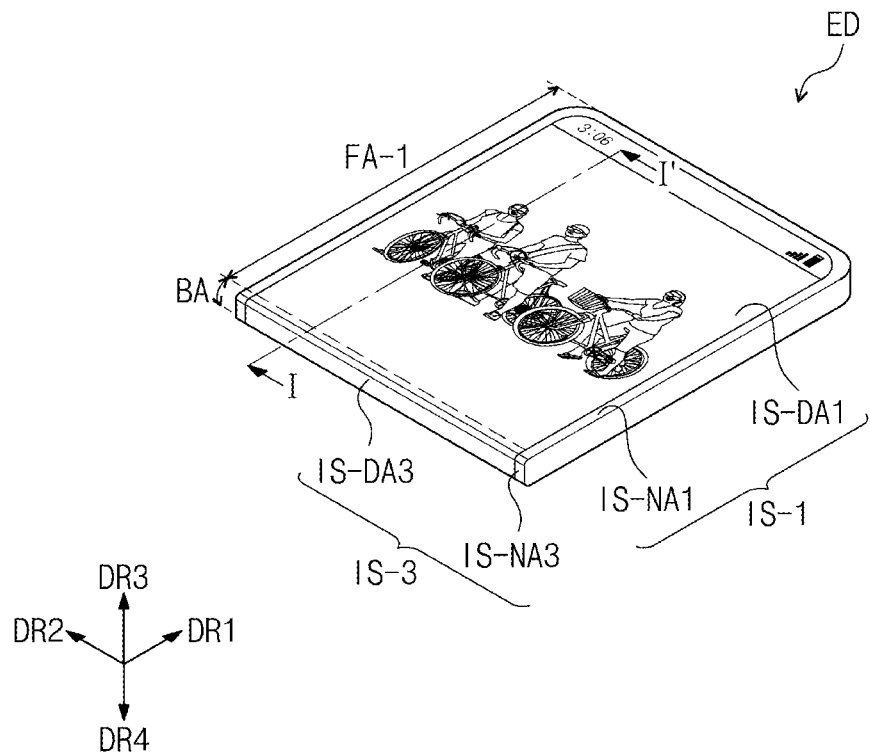
FIG. 1A is a perspective view illustrating an electronic device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3/DR4 axis are not limited to three axes of a rectangular coordinate system, such as the x, y, and z-axes, and may be interpreted in a broader sense. For example, the DR1-axis, the DR2-axis, and the DR3/DR4-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one to or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a window molding apparatus and a window molding method according to an embodiment of the inventive concept will be described with reference to the drawings.

Figure 1B:
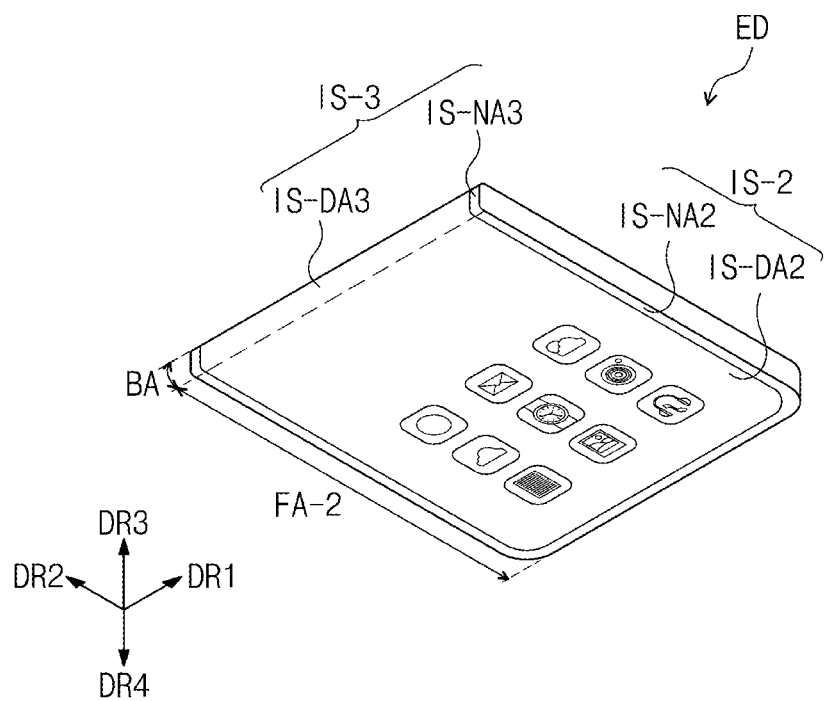
FIG. 1B is a perspective view illustrating an electronic device according to an embodiment.

Hereinafter, embodiments of the inventive concept will be described with reference to the accompanying drawings. FIGS. 1A and 1B are perspective views of an electronic device according to an embodiment. An electronic device ED according to an embodiment may include a plurality of display surfaces IS-1, IS-2, and IS-3. The electronic device ED according to an embodiment may display an image on the plurality of display surfaces IS-1, IS-2, and IS-3. FIGS. 1A and 1B are perspective views of the same electronic device ED when viewed on the same drawing, respectively. FIG. 1A is a perspective view illustrating the electronic device ED when viewed in a third direction DR3, and FIG. 1B is a perspective view illustrating the electronic device ED when viewed in a fourth direction DR4.

In FIGS. 1A and 1B and the following figures, the first to fourth directional axes DR1 to DR4 are illustrated, and directions indicated by the first to fourth directional axes DR1, DR2, DR3, and DR4, which are described in this specification are relative concepts and thus may be changed into different directions.

In this specification, the first directional axis DR1 and the second directional axis DR2 may be perpendicular to each other, and the third directional axis DR3 and the fourth directional axis DR4 may be normal directions with respect to a plane defined by the first direction DR1 and the second direction DR2. The third directional axis DR3 and the fourth directional axis DR4 may be directions that extend in directions opposite to each other.

Also, an X-axis X, a Y-axis Y, and a Z-axis Z are illustrated in this specification, and in this specification. In this specification, for convenience of description, a direction of the Z-axis Z is defined as an upward direction. Further, the X-axis X and the Y-axis Y may be perpendicular to each other, and the direction of the Z-axis Z may be a normal direction with respect to a plane defined by the X-axis X and the Y-axis Y.

The electronic device ED according to an embodiment may be a device that is activated according to an electrical signal. The electronic device ED may include various examples. For example, the electronic device ED may include a tablet, a notebook, a computer, a smart television, and the like. In this embodiment, an electronic device ED including a smart phone will be described as an example.

The electronic device ED includes a first flat area FA-1 including a first display surface IS-1, a second flat area FA-2 including a second display surface IS-2, and a bent area BA including the third display surface IS-3. The bent area BA may be a portion disposed between the first flat area FA-1 and the second flat area FA-2. The bent area BA may be disposed between the first flat area FA-1 and the second flat area FA-2 and may include a plurality of portions having different curvature radii. For example, the bent area BA may include a flat portion and a curved portion. The bent area BA may have a staple shape ("⊏" shape), and in this case, a portion bent in the staple shape may include a curved portion. The first flat area FA-1 and the second flat area FA-2 may be spaced apart and face each other in the direction of the third directional axis DR3.

The first display surface IS-1 may include a first display area IS-DA1 and a first peripheral area IS-NA1 adjacent to the first display area IS-DA1. The second display surface IS-2 includes a second display area IS-DA2 and a second peripheral area IS-NA2 adjacent to the second display area IS-DA2, and the third display surface IS-3 may include a third display area IS-DA3 and a third peripheral area IS-NA3 adjacent to the third display area IS-DA3. In this specification, each of the display areas IS-DA1, IS-DA2, and IS-DA3 is defined as an area on which an actual image is displayed, and each of the peripheral areas IS-NA1, IS-NA2, IS-NA3 is defined as an area on which an image is not displayed. Each of the peripheral areas IS-NA1, IS-NA2, and IS-NA3 may be provided in various colors through a printed layer. However, the embodiment is not limited thereto, and at least a portion of the peripheral areas IS-NA1, IS-NA2, and IS-NA3 may be omitted.

The first display surface IS-1 may be parallel to a plane defined by the first directional axis DR1 and the second directional axis DR2. The first display surface IS-1 may be a flat surface when viewed on the plane. In this specification, the meaning of "when viewed on the plane or in the plan view" may mean a case when viewed in the direction of the third directional axis DR3 or the fourth directional axis DR4. A front surface (or a top surface) and a rear surface (or a bottom surface) of each of layers or units, which will be described below, are distinguished by the third directional axis DR3. The first display area IS-DA1 of the first display surface IS-1 may provide an image in the direction of the third directional axis DR3.

Also, in the electronic device ED according to an embodiment, the second display surface IS-2 may be parallel to the plane defined by the first directional axis DR1 and the second directional axis DR2. The second display surface IS-2 may be a flat surface when viewed on the plane. The second display surface IS-2 may be parallel to the first display surface IS-1. The second display area IS-DA2 of the second display surface IS-2 may provide an image in the direction of the fourth directional axis DR4.

The third display surface IS-3 may be a portion disposed between the first display surface IS-1 and the second display surface IS-2, and each of the first display surface IS-1 and the second display surface IS-2 may be a portion that is bent at an angle of about 180° with respect to the third display surface IS-3. The third display area IS-DA3 of the third display surface IS-3 may provide an image in a direction between the third directional axis DR3 and the fourth directional axis DR4. The first display surface IS-1 and the second display surface IS-2 may be spaced apart from each other with the third display surface IS-3 therebetween in the direction of the third directional axis DR3 or the fourth directional axis DR4. The third display surface IS-3 may have a curved shape that is convex outward. However, the embodiment of the inventive concept is not limited thereto. The third display surface IS-3 may be a flat surface. Alternatively, unlike this, the curved surface of the third display surface IS-3 may have a half-elliptic shape in a cross-section parallel to the surface defined by the first directional axis DR1 and the third directional axis DR3, or the third display surface IS-3 may have both a curved surface and a flat surface. The third display surface IS-3 may provide an image in a direction different from the direction in which the first display surface IS-1 and the second display surface IS-2 provide an image and may be provided in various shapes in the form including a bent portion between the first display surface IS-1 and the second display surface IS-2.

Each of the first to third display areas IS-DA1, IS-DA2, and IS-DA3 may display different images. The images displayed on the first to third display areas IS-DA1, IS-DA2, and IS-DA3 may be the same one image or different images. Also, the images displayed from each of the first to third display areas IS-DA1, IS-DA2, and IS-DA3 may be connected to each other to display one image. Each of the first to third display areas IS-DA1, IS-DA2, and IS-DA3 may be controlled independently of each other.

Figure 1C:
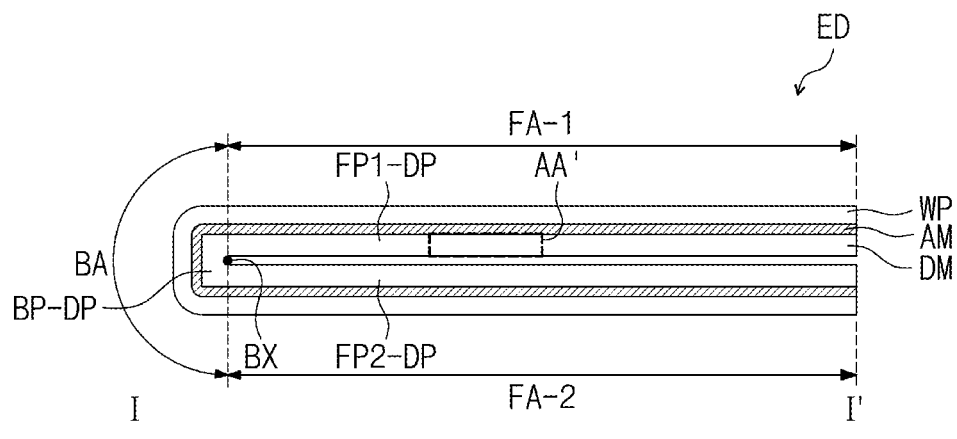
FIG. 1C is a perspective view illustrating an electronic device according to an embodiment.
Figure 1C:
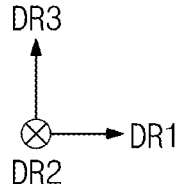
Figure 1D:
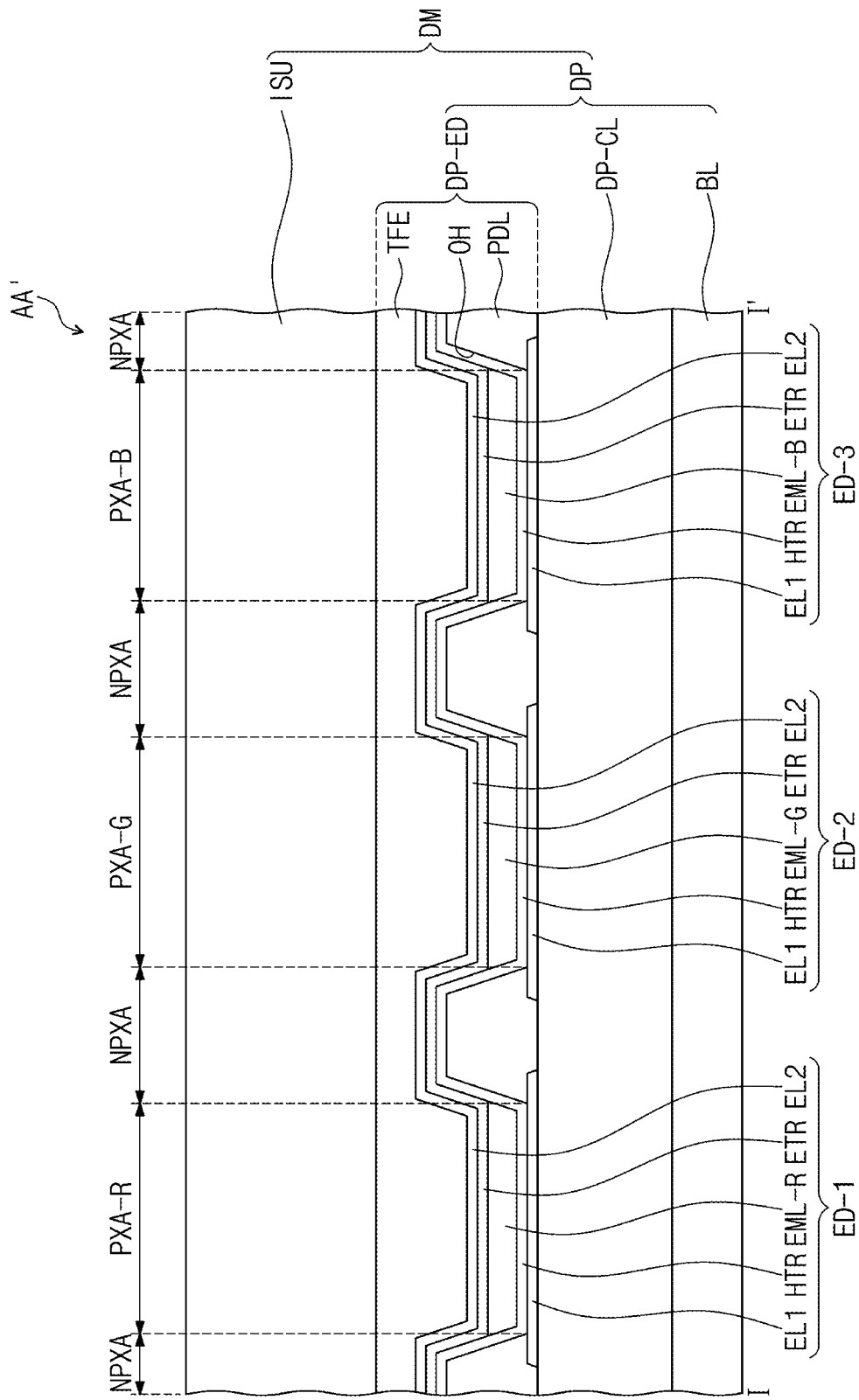
FIG. 1D is a cross-sectional view illustrating a display module according to an embodiment.

FIG. 1C is a perspective view illustrating an electronic device according to an embodiment. FIG. 1D is a cross-sectional view illustrating a display module included in the electronic device according to an embodiment. FIG. 1D is a cross-sectional view illustrating a portion corresponding to an area A-A' of FIG. 1C.

Referring to FIG. 1C, an electronic device ED according to an embodiment may include a display module DM and a window WP disposed on the display module DM. In an embodiment, the window WP may be disposed outside the display module DM. The window WP may cover the entire outside of the display module DM. The window WP may have a shape corresponding to a shape of the display module DM. The display module DM may include flat portions FP1-DP and FP2-DP and a bent portion BP-DP. The bent portion BP-DP may be a portion that is bent with respect to a bending axis BX extending in one direction parallel to the second directional axis DR2. For example, the bent portion BP-DP may include a flat portion and a curved portion. The flat portion of the bent portion BP-DP may be a portion parallel to a plane defined by the second directional axis DR2 and the third directional axis DR3, and the bent portion BP-DP may be a curved portion that connects between the flat portion and the flat portions FP1-DP and FP2-DP of the bent portion BP-DP.

In an embodiment, an adhesive layer AM may be disposed between the display module DM and the window WP. The adhesive layer AM may be an optically clear adhesive layer.

Referring to FIG. 1D, the display module DM according to an embodiment may include a display panel DP that outputs an image displayed on the electronic device ED. The display panel DP according to an embodiment may include a light emitting element layer DP-ED including an organic light emitting element, a quantum dot light emitting element, a micro LED light emitting element, or a nano LED light emitting element. The light emitting element layer DP-ED may be configured to substantially generate an image. Hereinafter, the display panel DP is described as an organic light emitting display panel, but the embodiment is not limited thereto.

The display panel DP according to an embodiment may have a bent shape as illustrated in FIG. 1C. However, the embodiment is not limited thereto, and the display panel DP may have a different type of bending state than that illustrated in FIG. 1C, or the display panel DP is a flexible display panel that is capable of bent or unfolded. For example, the flexible display panel DP may be bent to be inserted into the window WP bent at a large bending angle.

The display panel DP includes a base layer BL, a circuit layer DP-CL disposed on the base layer BL, a light emitting element layer DP-ED, and an upper insulating layer TFE. The base layer BL may include a plastic substrate, a glass substrate, a metal substrate, and an organic/inorganic composite substrate. For example, the base layer BL may include at least one polyimide layer.

The circuit layer DP-CL includes at least one insulating layer, semiconductor patterns, and conductive patterns. The insulating layer includes at least one inorganic layer and at least one organic layer. The semiconductor patterns and the conductive patterns may constitute signal lines, a pixel driving circuit, and a scan driving circuit. For example, the circuit layer DP-CL includes a switching transistor and a driving transistor configured to drive the light emitting elements ED-1, ED-2, and ED-3 of the light emitting element layer DP-ED.

The light emitting element layer DP-ED includes a display element, for example, the light emitting elements ED-1, ED-2, and ED-3. The light emitting element layer DP-ED may further include an organic layer such as a pixel defining layer PDL. The display module DM may include a non-emission area NPXA and emission areas PXA-R, PXA-G, and PXA-B. Each of the emission areas PXA-R, PXA-G, and PXA-B may be an area from which light generated from each of the light emitting elements ED-1, ED-2, and ED-3 is emitted.

Each of the light emitting elements ED-1, ED-2, and ED-3 includes a first electrode EL1, a hole transport region HTR, light emitting layers EML-R, EML-G, and EML-B, an electron transport region ETR, and a second electrode EL2

FIG. 1D illustrate an embodiment in which the light emitting layers EML-R, EML-G, and EML-B of the light emitting elements ED-1, ED-2, and ED-3 are disposed in an opening OH defined in the pixel defining layer PDL, and the hole transport region HTR, the electron transport region ETR, and the second electrode EL2 are provided as common layers in all of the light emitting elements ED-1, ED-2, and ED-3. However, the embodiment is not limited thereto, and unlike FIG. 2, in an embodiment, the hole transport region HTR and the electron transport region ETR may be provided to be patterned in the opening OH defined in the pixel defining layer PDL. For example, in an embodiment, the hole transport region HTR, the light emitting layers EML-R, EML-G, and EML-B, and the electron transport region ETR of the light emitting elements ED-1, ED-2, and ED-3 and the like may be provided by being patterned by an inkjet printing method.

In the display panel DP according to an embodiment, the plurality of light emitting elements ED-1, ED-2, and ED-3 may emit light having different wavelength regions. For example, in an embodiment, the display panel DP may include a first light emitting element ED-1 that emits red light, a second light emitting element ED-2 that emits green light, and a third light emitting element ED-3 that emits blue light. That is, a red emission area PXA-R, a green emission area PXA-G, and a blue emission area PXA-B of the display module DM may correspond to the first light emitting element ED-1, the second light emitting element ED-2, and the third light emitting element ED-3, respectively.

However, the embodiment is not limited thereto, and the first to third light emitting elements ED-1, ED-2, and ED-3 may emit light having the same wavelength region, or at least one of the light emitting elements may emit light having a different wavelength region. For example, all of the first to third light emitting elements ED-1, ED-2, and ED-3 may emit blue light.

The upper insulating layer TFE may include a plurality of thin films. Some of the thin films may be disposed to improve optical efficiency, and some of the thin film may be disposed to protect the light emitting elements. The upper insulating layer TFE may include a thin film encapsulation layer including a lamination structure of an inorganic layer/organic layer/inorganic layer.

The display module DM may further include a sensor layer ISU. The sensor layer ISU may be disposed on the display panel DP. The sensor layer ISU may sense an external input applied from the outside. The external input may be a user's input. The user's input may include various types of external inputs such as a portion of user's body, light, heat, a pen, a pressure, or the like.

The sensor layer ISU may be formed on the upper insulating layer TFE through a continuous process. In this case, it may be expressed that the sensor layer ISU is directly disposed on the upper insulating layer TFE. The direct disposition may mean that a third component is not disposed between the sensor layer 120 and the upper insulating layer 110. That is, a separate adhesive member may not be disposed between the sensor layer ISU and the upper insulating layer TFE. However, the embodiment is not limited thereto, and an adhesive member (not illustrated) may be further disposed between the sensor layer ISU and the upper insulating layer TFE. In an embodiment, the sensor layer ISU may include sensing electrodes that sense an external input, and the sensing electrodes may be made of transparent metal oxide or the like.

Figure 2:
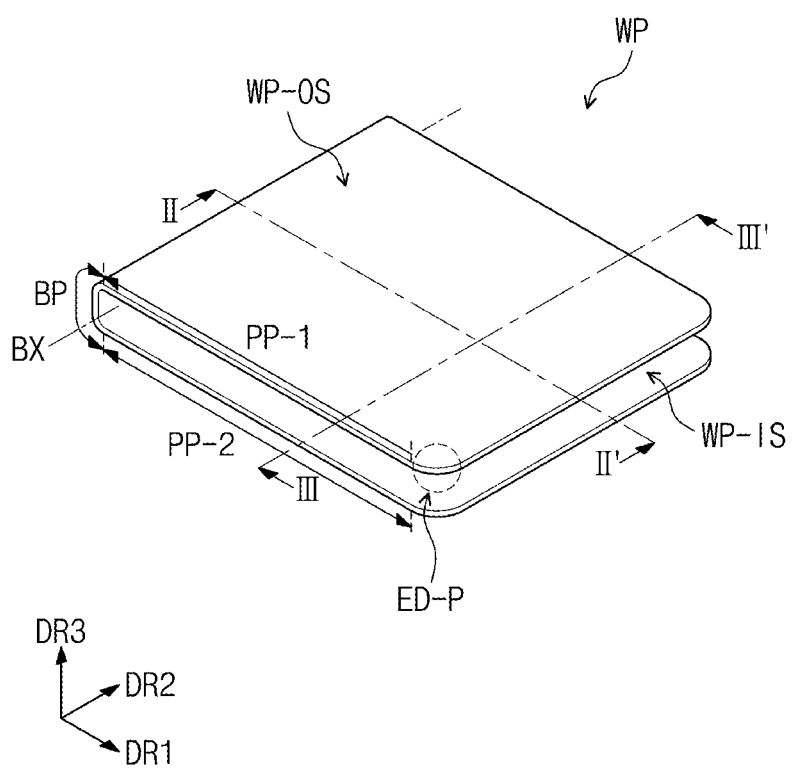
FIG. 2 is a perspective view illustrating a window according to an embodiment.
Figure 3A:
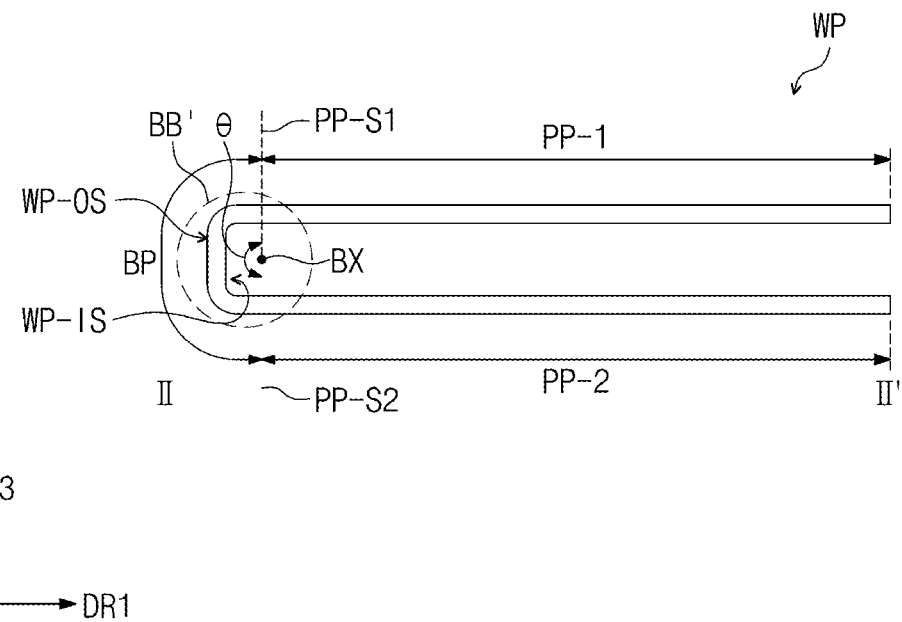
FIG. 3A is a cross-sectional view illustrating the window according to an embodiment.
Figure 3B:
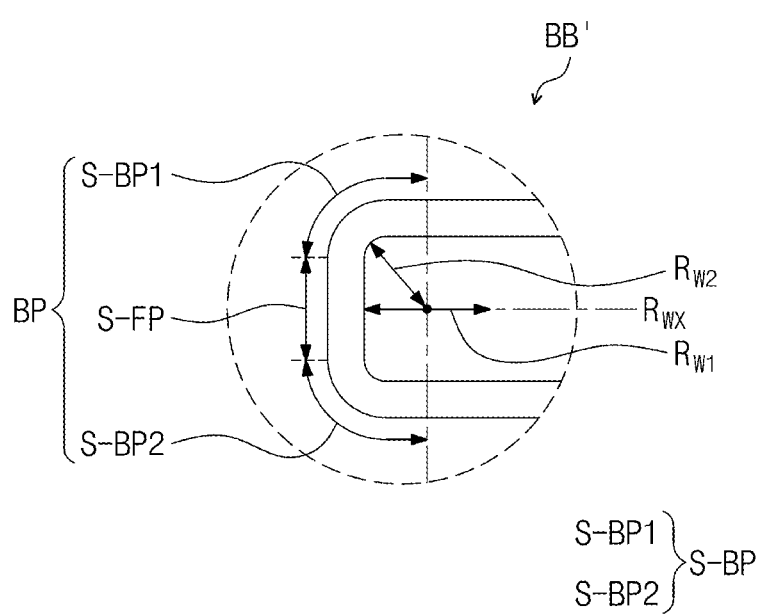
FIG. 3B is a cross-sectional view illustrating the window according to an embodiment.

FIG. 2 is a perspective view illustrating a window according to an embodiment, and FIG. 3A is a cross-sectional view illustrating the window according to an embodiment. FIG. 3B is a cross-sectional view illustrating a portion of the window according to an embodiment. FIG. 3A is a view illustrating a portion corresponding to a line II-IF of FIG. 2, and FIG. 3B is an enlarged view of a portion BB' of FIG. 3A.

The window WP illustrated in FIGS. 2 and 3B according to an embodiment may be provided in the electronic device ED (see FIG. 1A) illustrated in FIGS. 1A to 1C according to an embodiment. The window WP may correspond to the uppermost layer of the electronic device ED. The window WP may be a tempered glass substrate subjected to a tempered treatment. The display module DM (see FIG. 1C) may be attached to an inner surface WP-IS of the window WP, and an outer surface WP-OS of the window WP may be defined as the display surfaces IS-1, IS-2, and IS-3 (see FIG. 1A). The window WP may include a reinforced surface to stably protect the display module DM (see FIG. 1C) from an external impact.

The window WP according to an embodiment may include a first portion, a second portion, and a third portion disposed between the first portion and the second portion. The third portion may be disposed between the first portion and the second portion and include a bent portion. The third portion may be a portion including curved surfaces having different curvature radii or may be a portion including a curved surface and a flat surface.

Hereinafter, in this specification, the third portion BP may be referred to as a bent potion BP, and the first portion PP-1 and the second portion PP-2 may be referred to as a first non-bent portion PP-1 and a second non-bent portion PP-2, respectively. The window WP according to an embodiment may include the bent portion BP and the first and second non-bent portions PP-1 and PP-2, which are respectively disposed on both sides of the bent portion BP. Although not illustrated in the drawings, the window WP according to an embodiment may further include a printed layer (not illustrated) disposed at an edge of the inner surface WP-IS or the outer surface WP-OS. For example, the printed layer (not illustrated) may be a portion corresponding to the peripheral areas IS-NA1, IS-NA2, and IS-NA3, FIGS (see FIGS. 1A and 1B).

Referring to FIGS. 2 to 3B, in the window WP according to an embodiment, the bent portion BP may be a portion that is bent with respect to the bending axis BX extending in one direction parallel to the second directional axis DR2. In the window WP according to an embodiment, the first non-bent portion PP-1 and the second non-bent portion PP-2 disposed with the bent portion BP therebetween may face each other in parallel to each other. However, the embodiment is not limited thereto, and an extended surface of the first non-bent portion PP-1 and an extended surface of the second non-bent portion PP-2 may not be parallel to each other. For example, when the extension surface of the first non-bent portion PP-1 and the extension surface of the second non-bent portion PP-2 gradually approach each other in the first directional axis DR1 that is an extending direction of the extension surface, the extension surfaces may gradually close to each other or gradually away from each other in the first directional axis DR1 that is the extending direction.

The window WP according to an embodiment may be rigid. The window WP according to an embodiment may be fixed in a shape in which the first non-bent portion PP-1 and the second non-bent portion PP-2 face each other so as to be spaced apart from each other with the bent portion BP therebetween.

In FIGS. 2 and 3A, the first non-bent portion PP-1 and the second non-bent portion PP-2 facing each other have the same surface area, but the embodiment is not limited thereto. The first non-bent portion PP-1 and the second non-bent portion PP-2 disposed with the bent portion BP therebetween may have surface areas different from each other. Also, in FIGS. 2 and 3A, the shapes of the first non-bent portion PP-1 and the second non-bent portion PP-2 facing each other are illustrated to be symmetrical with respect to the bent portion BP, but the embodiment is limited thereto. For example, the shapes of the first non-bent portion PP-1 and the second non-bent portion PP-2 may be different from each other.

In this specification, a bending angle θ of the bent portion BP may be defined as an angle between the point PP-S1, at which the first non-bent portion PP-1 starts, and the point PP-S2, at which the second non-bent portion PP-2 starts. The bending angle θ in the window WP illustrated in FIGS. 2 and 3A according to an embodiment may be about 180°.

The bending angle θ in the window WP according to an embodiment, which is manufactured by the window molding apparatus according to an embodiment of the inventive concept, may be greater than about 120°. That is, the window WP according to an embodiment may be bent at the bending angle θ greater than about 120°. Also, the bending angle θ in the window WP according to an embodiment may be greater than about 180°. For example, the bending angle θ may be about 180° or more and may be less than an angle within a range in which the two non-bent portions PP-1 and PP-2 do not meet each other.

In the window WP according to an embodiment, the bent portion BP may be defined as a portion between a portion, at which the first non-bent portion PP-1 starts, and a portion, at which the second non-bent portion PP-2 starts. In an embodiment, the bent portion BP may include a first sub-bent portion S-FP and a second sub-bent portion S-BP. The second sub-bent portion S-BP may be a portion that is adjacent to the first sub-bent portion S-FP and disposed between the non-bent portions PP-1 and PP-2 and the first sub-bent portion S-FP. Also, the second sub-bent portion S-BP includes a first sub-portion S-BP1 disposed between the first bent portion PP-1 and the first sub-bent potion S-FP and a second sub-portion S-BP2 disposed between the second non-bent portion PP-2 and the first sub-bent portion S-FP, as denoted in the key in FIG. 3B.

Each of the first sub-bent portion S-FP and the second sub-bent portion S-BP of the window WP according to an embodiment may be a portion of a circle having a predetermined curvature radius or a portion of an ellipse on the cross-section defined by the first directional axis DR1 and the third directional axis DR3. In an embodiment, the first sub-bent portion S-FP and the second sub-bent portion S-BP may be portions having different curvature radii. For example, when viewed in the cross-section defined by the first and third directional axes DR1 and DR3, the bent portion BP of the window WP according to an embodiment may have a shape having a variable curvature at which the portion having the different curvature radii are connected to each other.

A curvature radius RW1 of the first sub-bent portion S-FP may be greater than a curvature radius RW2 of the second sub-bent portion S-BP. For example, the curvature radius RW1 of the first sub-bent portion S-FP may be about 1 mm or more and about 10 mm or less, with respect to a virtual curvature center RWX, and the curvature radius RW2 of the second sub-bent portion S-BP may be about 4 mm or less. In an embodiment, the first sub-bent portion S-FP may be a portion including a flat surface, and the second sub-bent portion S-BP may be at least one portion including a curved surface.

In the window WP according to an embodiment, the first sub-bent portion S-FP has a relatively larger curvature radius than that of the second sub-bent portion S-BP, and thus, a user's touch area of the electronic device ED (see FIG. 1) may be improved at a portion corresponding to the first sub-bent portion S-FP. Also, the second sub-bent portion S-BP may be connected to the non-bent portions PP-1 and PP-2 while providing the curved portions having a curvature radius that is relatively less than that of the first sub-bent portion S-FP that is configured to improve a grip property for a user to hold the electronic device ED (see FIG. 1).

In FIG. 3B, although it is illustrated that the first sub-portion S-BP1 and the second sub-portion S-BP2 of the second sub-bent portion S-BP have the same curvature radius RW2, the embodiment is limited thereto. For example, the first sub-portion S-BP1 and the second sub-portion S-BP2 may have curvature radii different from each other.

In FIG. 2, in the window WP according to an embodiment, four corner portions ED-P of the window WP are illustrated as being curved, but the embodiment is not limited thereto. At least one of the corner portions ED-P of the window WP may have a substantial right-angled shape on the plane defined by the first directional axis DR1 and the second directional axis DR2. For example, each of the corner portions ED-P of the window WP may have a curvature radius of about 0.1 mm to about 15 mm.

In an embodiment illustrated in FIG. 2, the corner portions ED-P of the window WP may be a flat surface parallel to the plane defined by the first and second directional axes DR1 and DR2. However, the embodiment is not limited thereto, and the corner portions ED-P may include portions that are bent in the direction of the fourth directional axis DR4. Each of the corner portions ED-P may have one bent portion or may have two or four bent portions therearound.

The window WP includes the bent portion BP bent with respect to the bending axis BX, and the bent portion BP may have the curvature radius so that the curvature radius of the window inner surface WP-IS is less than that of the window outer surface WP-OS. Referring to FIG. 2, the bent portion BP may have the same width as each of the non-bent portions PP-1 and PP-2 in the direction of the second directional axis DR2. However, the embodiment is not limited thereto, and the width of the bent portion BP may be less than that of each of the non-bent portions PP-1 and PP-2, or the width of the bent portion BP may be greater than that of each of the non-bent portions PP-1 and PP-2.

Hereinafter, FIGS. 4A to 5E illustrate windows according to embodiments.

Figure 4A:
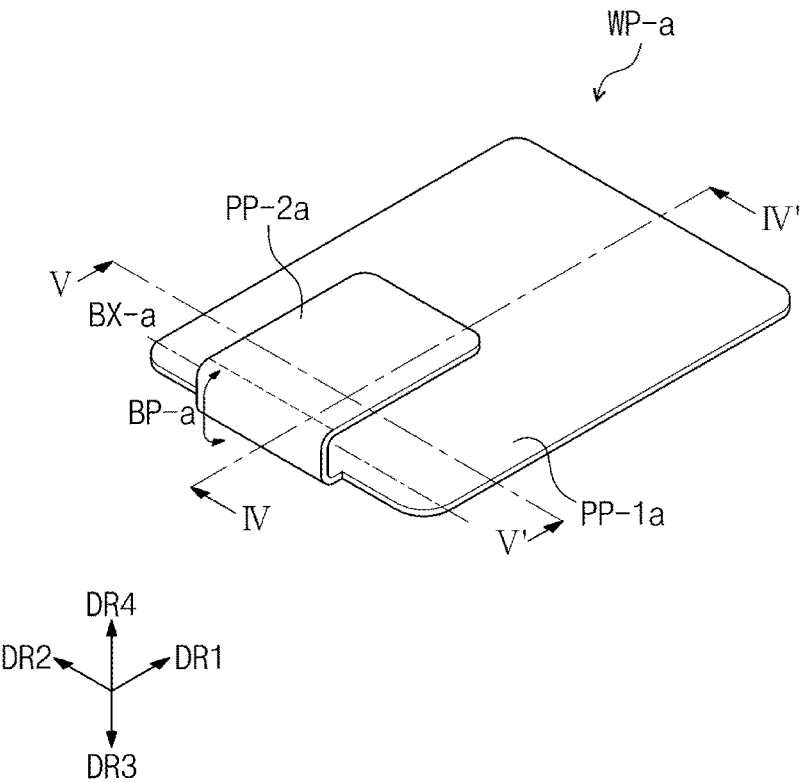
FIG. 4A is a perspective view illustrating a window according to an embodiment.
Figure 4B:
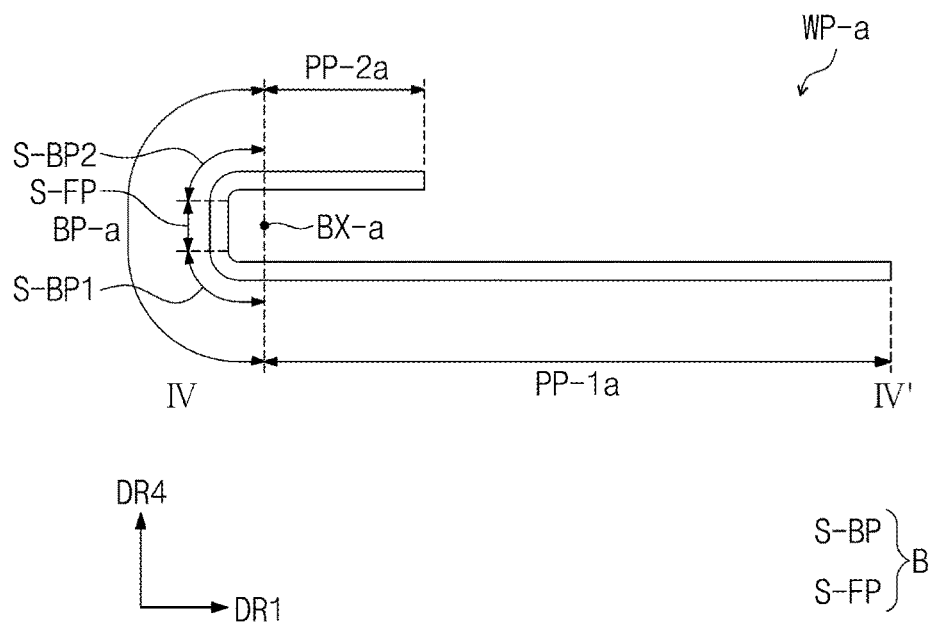
FIG. 4B is a cross-sectional view illustrating the window according to an embodiment.
Figure 4C:
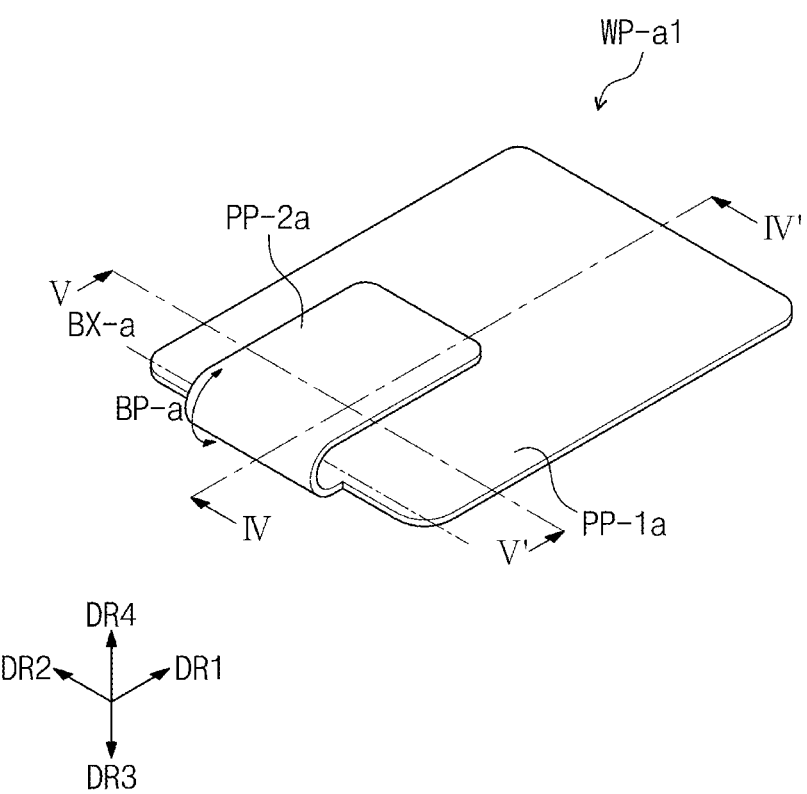
FIG. 4C is a perspective view illustrating a window according to an embodiment.

FIGS. 4A and 4C are perspective views illustrating windows WP-a and WP-a1 that are bent with respect to a bending axis BX-a extending in the direction of the second directional axis DR2, which is a direction of a short axis of the window. FIG. 4B is a cross-sectional view taken along line IV-IV' of FIG. 4A. Referring to FIGS. 4A to 4C, the window WP-a according to an embodiment may include a first non-bent portion PP-1a and a second non-bent portion PP-2a, which face each other in the direction of the third directional axis DR3 or the fourth directional axis DR4, and a bent portion BP-a disposed between the first non-bent portion PP-1a and the second non-bent portion PP-2a. In the windows WP-a and WP-a1 according to an embodiment, the first non-bent portion PP-1a and the second non-bent portion PP-2a may have surface areas different from each other. The second non-bent portion PP-2a may overlap only a portion of the first non-bent portion PP-1a. The first non-bent portion PP-1a may have a surface area greater than that of the second non-bent portion PP-2a. In FIGS. 4A to 4C, although the second non-bent portion PP-2a is illustrated as being disposed at a central portion of the first non-bent portion PP-1a, the embodiment is not limited thereto. For example, in the windows WP-a and WP-a1 according to an embodiment, the second non-bent portion PP-2a may be disposed to be lean to one side of the first non-bent portion PP-1a.

Unlike illustrated embodiments, the window according to an embodiment may have the second non-bent portion PP-2a having a shape in which a width of the second non-bent portion PP-2a in the direction of the first directional axis DR1 is the same as that of the first non-bent portion PP-1a in the direction of the first directional axis DR1, and a width of the second non-bent portion PP-2a in the direction of the second directional axis DR2 is less than that of the first non-bent portion PP-1a in the direction of the second directional axis DR2. Also, in the window according to an embodiment, the second non-bent portion PP-2a may have the second non-bent portion PP-2a having a shape in which a width of the second non-bent portion PP-2a in the direction of the second directional axis DR2 is the same as that of the first non-bent portion PP-1a in the direction of the second directional axis DR2, and a width of the second non-bent portion PP-2a in the direction of the first directional axis DR1 is less than that of the first non-bent portion PP-1a in the direction of the first directional axis DR1 is less than that of the first non-bent portion PP-1a in the direction of the first directional axis DR1.

Referring to FIG. 4A, the width of the bent portion BP-a may be the same as the width of the second non-bent portion PP-2a in the direction of the second directional axis DR2. However, the embodiment is not limited thereto, and the width of the bent portion BP-a and the width of the second non-bent portion PP-2a in the direction of the second directional axis DR2 may be different from each other. For example, the width of the bent portion BP-a may be less than the width of the second non-bent portion PP-2a, or the width of the bent portion BP-a may be greater than the width of the second non-bent portion PP-2a. Referring to FIG. 4B, the bent portion BP-a may include a first sub-bent portion S-FP and a second sub-bent portion S-BP, and the first sub-bent portion S-FP has a curvature radius greater than a curvature radius of the second sub-bent portion S-BP.

The window WP-a1 illustrated in FIG. 4C may be different from the window WP-a according to the embodiment illustrated in FIGS. 4A and 4B regarding a shape of the bent portion BP-a. In the window WP-a1 according to an embodiment, the bent portion BP-a may include a portion that convexly protrudes in a direction opposite to the extending direction of the first directional axis DR1. In the bent portion of BP-a of the window WP-a1 according to an embodiment, unlike the embodiment illustrated in FIG. 4A, the first sub-bent portion S-FP may have a curvature radius less than that of the second sub-bent portion S-BP. The window WP-a1 illustrated in FIG. 4C may not include a flat portion in the first sub-bent portion S-FP or may include only a small flat portion when compared to the window WP-a illustrated in FIG. 4A and the like.

In the windows WP, WP-a, WP-a1 illustrated in FIGS. 2 to 4C according to embodiments described herein, the bending axes BX and BX-a are illustrated parallel to each other in the direction of the second directional axis DR2, which is a short side direction of each of the windows WP and WP-a, but the embodiment is not limited thereto.

FIGS. 5A to 5E illustrate a window that is bent with respect to a bending axis BX-b parallel to the direction of the first directional axis DR1, which is a direction of a long side, according to an embodiment.

Referring to FIGS. 4A and 4B, windows WP-b1, WP-b2, WP-b3, and WP-b4 according to embodiments described herein may include a first non-bent portion PP-1b and a second non-bent portion PP-2b, which face each other in the direction of the third directional axis DR3 or the fourth directional axis DR4, and a bent portion BP-b disposed between the first non-bent portion PP-1b and the second non-bent portion PP-2b. In the windows WP-b1, WP-b2, WP-b3, and WP-b4 according to an embodiment, the first non-bent portion PP-1b and the second non-bent portion PP-2b may have surface areas different from each other. In the various embodiments, the second non-bent portion PP-2b may overlap only a portion of the first non-bent portion PP-1b. Also, the first non-bent portion PP-1b may have a surface area greater than that of the second non-bent portion PP-2b.

Figure 5A:
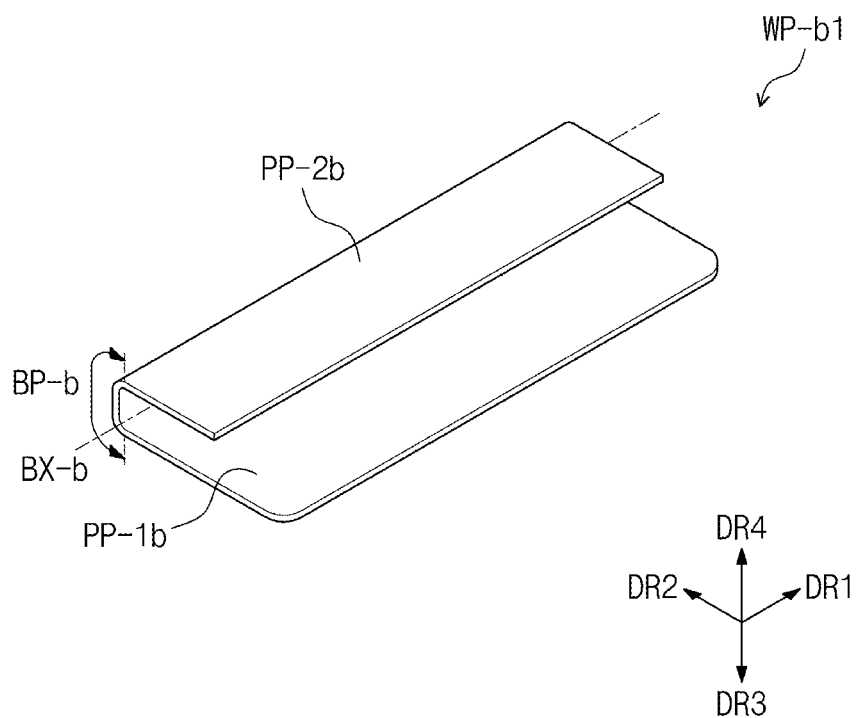
FIGS. 5A, 5B, 5C, and 5D are perspective views of a window according to an embodiment.
Figure 5B:
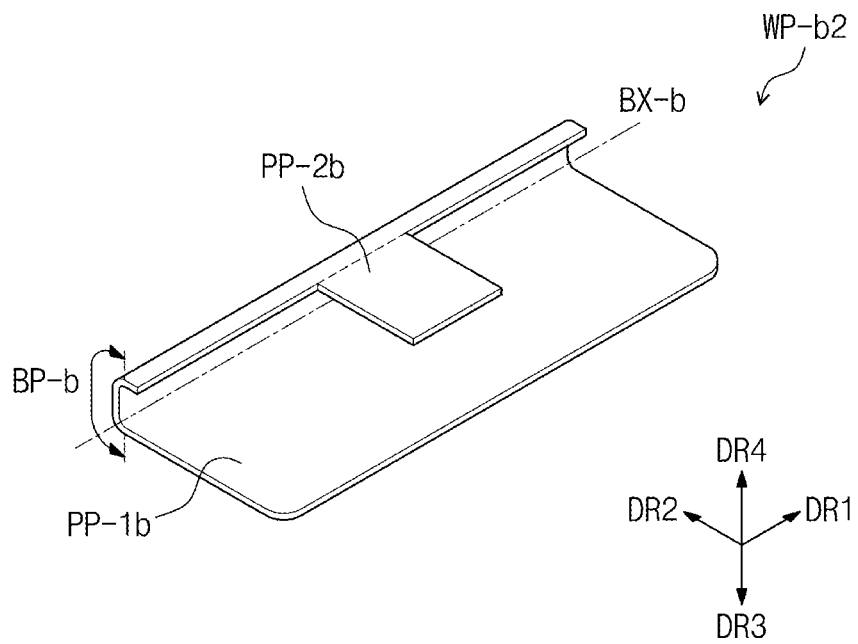
Figure 5C:
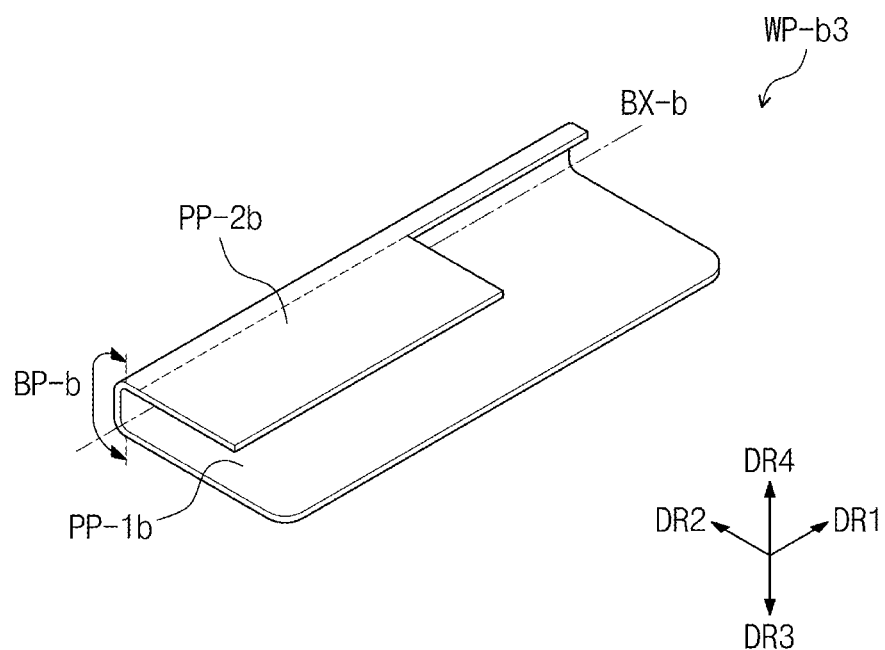
Figure 5D:
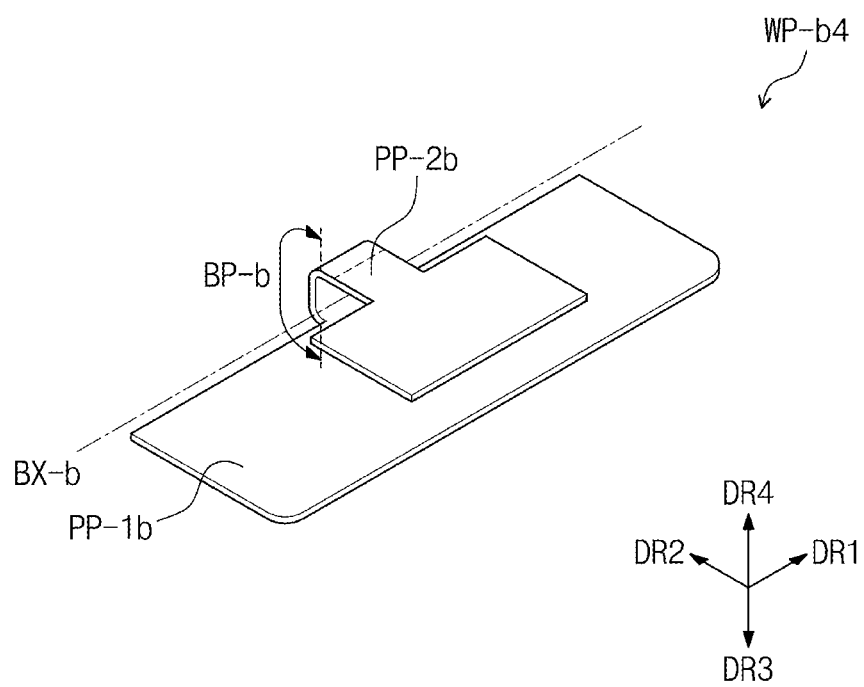

In the window WP-b1 according to the embodiment illustrated in FIG. 5A, the first non-bent portion PP-1b, the second non-bent portion PP-2b, and the bent portion BP-b may have a same width in the direction of the first directional axis DR1. In the windows WP-b2 and WP-b3 according to the embodiment illustrated in FIGS. 5B and 5C, a width of the second non-bent portion PP-2b may be less than that of each of the first non-bent portion PP-1b and the bent portion BP-b in the direction of the first directional axis DR1. FIG. 5B illustrates a window WP-b2, in which a second non-bent portion PP-2b is disposed to correspond to a central portion of a first non-bent portion PP-1b, according to an embodiment, and FIG. 5C illustrates a window WP-b2, in which a second non-bent portion PP-2b is disposed to one side of a first non-bent portion PP-1b, according to an embodiment. In the window WP-b4 according to the embodiment illustrated in FIG. 5A, a first non-bent portion PP-1b, a second non-bent portion PP-2b, and a bent portion BP-b may have widths different from each other in the direction of the first directional axis DR1. Referring to FIG. 5D, in the window WP-b4 according to an embodiment, the bent portion BP-b may be provided in a notch shape between the first non-bent portion PP-1b and the second non-bent portion PP-2b so as to have a width less than that of each of the first non-bent portion PP-1b and the second non-bent portion PP-2b.

The second non-bent portion PP-2b may have a dual width. One width of the dual width may be a same width as the bent portion BP-b. A second width of the dual width may be wider than the width of the bent portion BP-b.

Figure 5E:
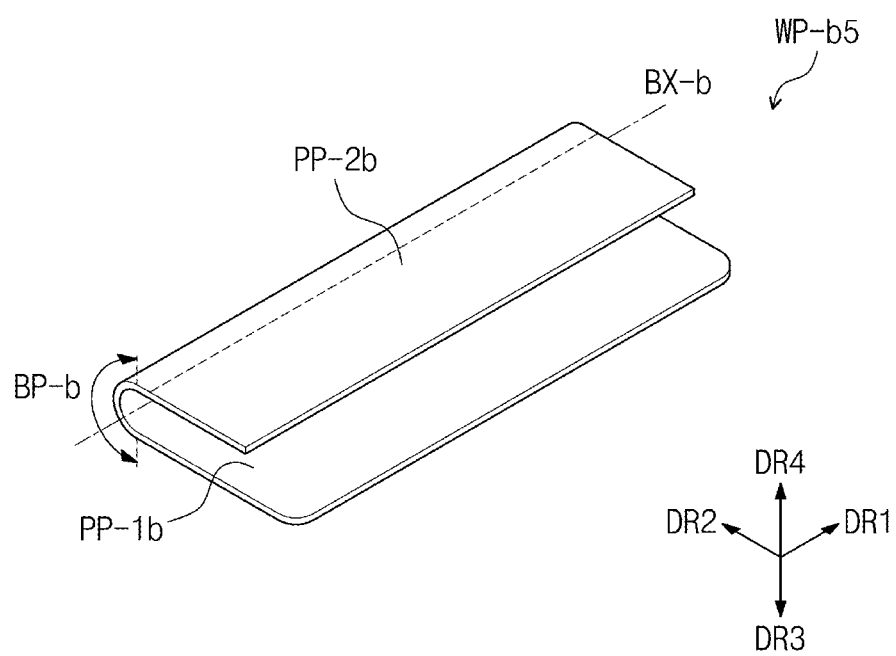
FIG. 5E is a perspective view of a window according to an embodiment.

The window WP-b5 according to the embodiment illustrated in FIG. 5E has a difference in the shape of the bent portion BP-b when compared to the window WP-b1 according to the embodiment illustrated in FIG. 5A. In the window WP-b5 according to an embodiment, the bent portion BP-b may include a portion that protrudes convexly in an extending direction of the second directional axis DR2. In the window WP-b5 according to an embodiment, the bent portion BP-b may not include a flat portion or may include only a small flat portion in the bent portion BP-b when compared to the window WP-b1 illustrated in FIG. 5A or the like. On the other hand, although not illustrated, in the embodiment of the window described with reference to FIGS. 5B to 5D, similar to the embodiment of FIG. 5E, the bent portion BP-b may include a portion that protrudes convexly in the extending direction of the second directional axis DR2.

The shape of the window according to an embodiment is not limited to those illustrated in this specification, and a ratio of the long side and the short side, the number of sub-bent portions having different curvature radii, which are provided in the bent portion, and relative positions of the two bent portions facing each other, and the like may be changed differently from those that are illustrated.

Figure 6A:
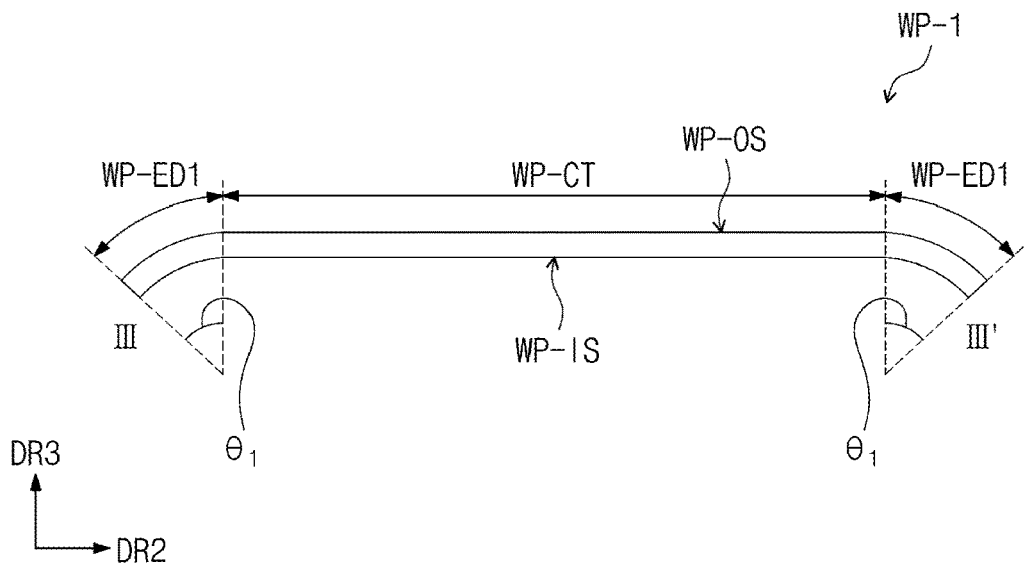
FIGS. 6A, 6B, and 6C are cross-sectional views of a window according to an embodiment.
Figure 6B:
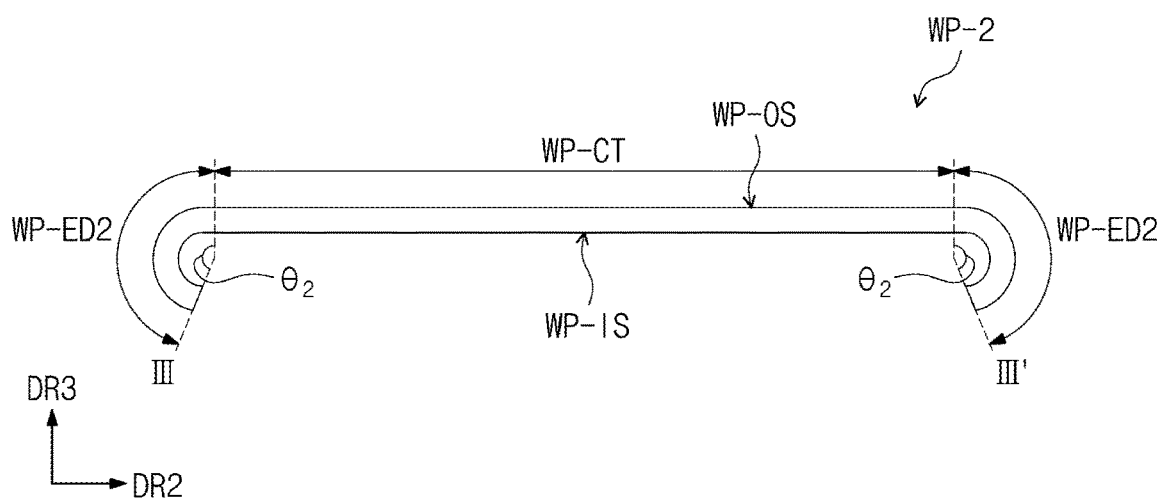
Figure 6C:
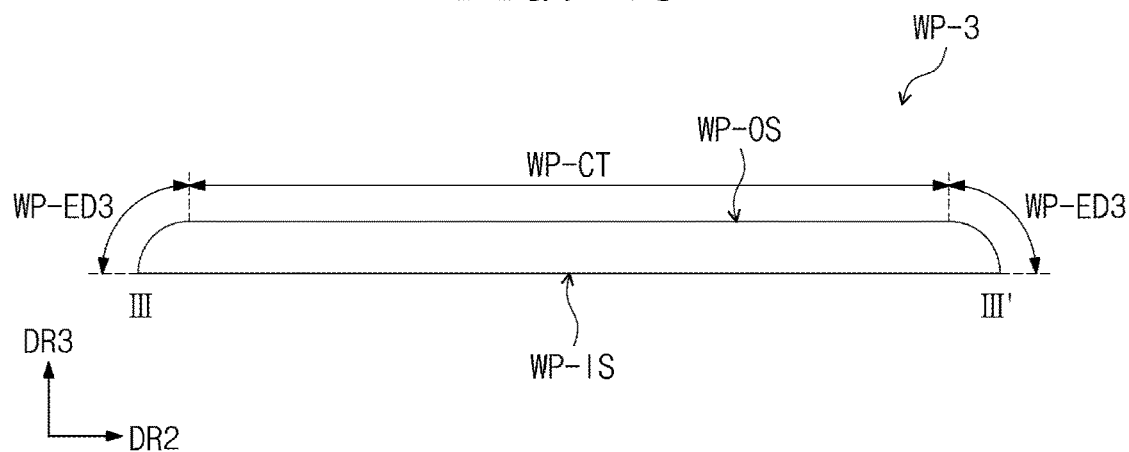

FIGS. 6A to 6C are cross-sectional views illustrating portions of the window according to embodiments described herein. FIGS. 6A to 6C may illustrate shapes in cross-section corresponding to a line of FIG. 2.

Each of the windows WP-1, WP-2, and WP-3 according to the embodiment illustrated in FIGS. 6A to 6C may include a portion that is bent at an edge thereof. The windows WP-1, WP-2, and WP-3 according to embodiments described herein have an inner surface WP-IS adjacent to the display module DM (see FIG. 1C) and an outer surface WP-OS facing the inner surface WP-IS. Also, the windows WP-1, WP-2, and WP-3 according to embodiments may include a central portion WP-CT and respective edge portions WP-ED1, WP-ED2, and WP-ED3. The edge portions WP-ED1, WP-ED2, and WP-ED3 may correspond to edge portions of the windows WP-1, WP-2, and WP-3, respectively. The edge portions WP-ED1, WP-ED2, and WP-ED3 in the windows WP-1, WP-2, and WP-3 according to an embodiment are bent toward the inner surface WP-IS of the window. In this specification, a bent angle of each of the edge portions WP-ED1, WP-ED2, and WP-ED3 may correspond to an angle between a start portion of each of the edge portions WP-ED1, WP-ED2, and WP-ED3, which are changed into a curved surface having a curvature radius at the central portion WP-CT that is a flat surface, and an edge portion of each of the windows WP-1, WP-2, and WP-3, which is an end portion of each of the edge portions WP-ED1, WP-ED2, and WP-ED3.

The window WP-1 according to the embodiment illustrated in FIG. 6A corresponds to a case in which the bent angle θ1 of the edge portion WP-ED1 is less than 90 degrees. The edge portion WP-ED1 may be bent at each of both sides of the central portion WP-CT of the window WP-1.

The window WP-2 of the embodiment illustrated in FIG. 6B corresponds to a case in which the bent angle θ2 of the edge portion WP-ED2 is 90 degrees or more. The edge portion WP-ED2 may be bent at each of both sides of the central portion WP-CT of the window WP-2.

In the windows WP-1 and WP-2 according to the embodiment illustrated in FIGS. 6A and 6B, the inner surface WP-IS and the outer surface WP-OS may be bent in the same shape. In comparison, in the window WP-3 according to the embodiment illustrated in FIG. 6C, the inner surface WP-IS in the edge portion WP-ED3 may be a flat surface, and the outer surface WP-OS in the edge portion WP-ED3 may be a curved surface.

Figure 7A:
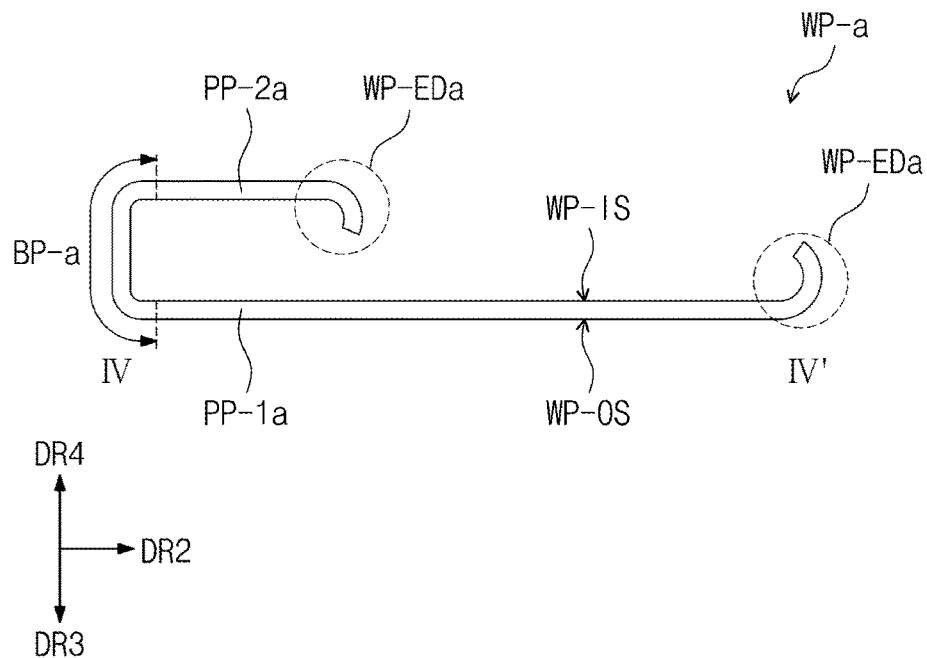
FIG. 7A is a cross-sectional view illustrating a window according to an embodiment.
Figure 7B:
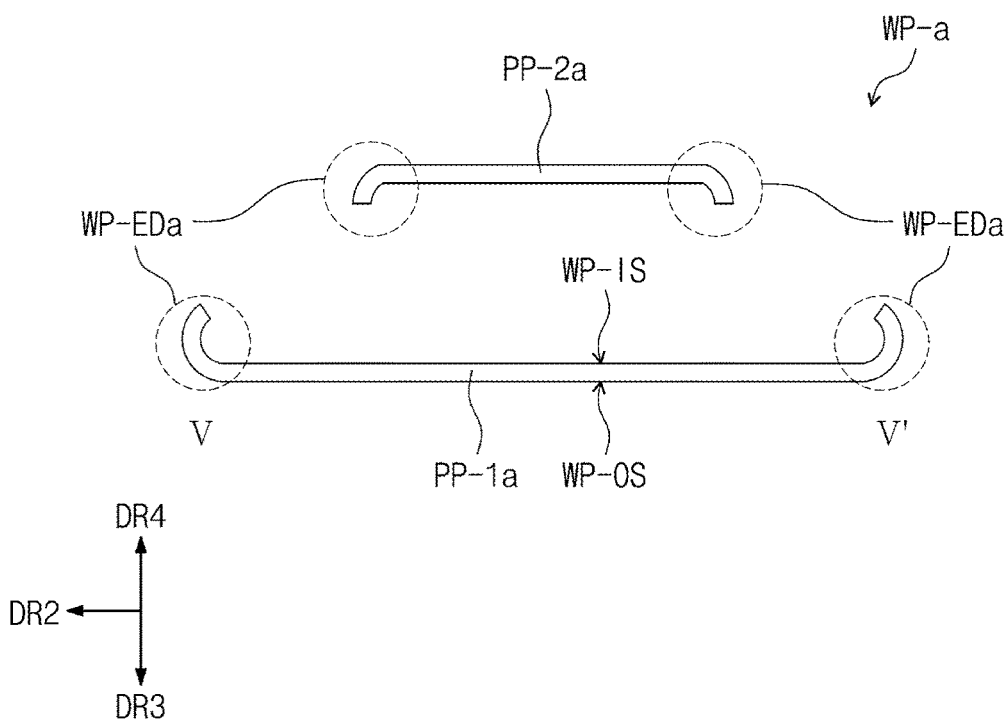
FIG. 7B is a cross-sectional view illustrating a window according to an embodiment.

FIGS. 7A and 7B are cross-sectional views taken along line IV-IV' and V-V' in the window WP-a according to the embodiment illustrated in FIG. 4A, respectively. Referring to FIGS. 7A and 7B, an edge portion WP-EDa adjacent to the edge of the window WP-a may be a portion bent toward the inner surface WP-IS of the window.

In the embodiment illustrated in FIGS. 7A and 7B, the entire edge portion WP-EDa of the window WP-a may be bent toward the inner surface WP-IS. However, the embodiment is not limited thereto, and at least some of the edge portions WP-EDa adjacent to the edge of the window WP-a may have different bent angles with respect to the remaining portions or may be flat surfaces.

The shape of the window manufactured by the window molding method using the window molding apparatus according to an embodiment is not limited to that illustrated in FIGS. 2 to 7B. In FIGS. 2 to 7B, a case in which the bending angle θ of the bent portion is about 180° is illustrated, but the embodiment is not limited thereto. For example, the window according to an embodiment may include a bent portion bent at a large bending angle of about 120° or more. Here, the window may be provided in various shapes in addition to the shape disclosed in this specification as long as the non-bent portion is provided at each of both sides with respect to the bent portion.

Figure 8:
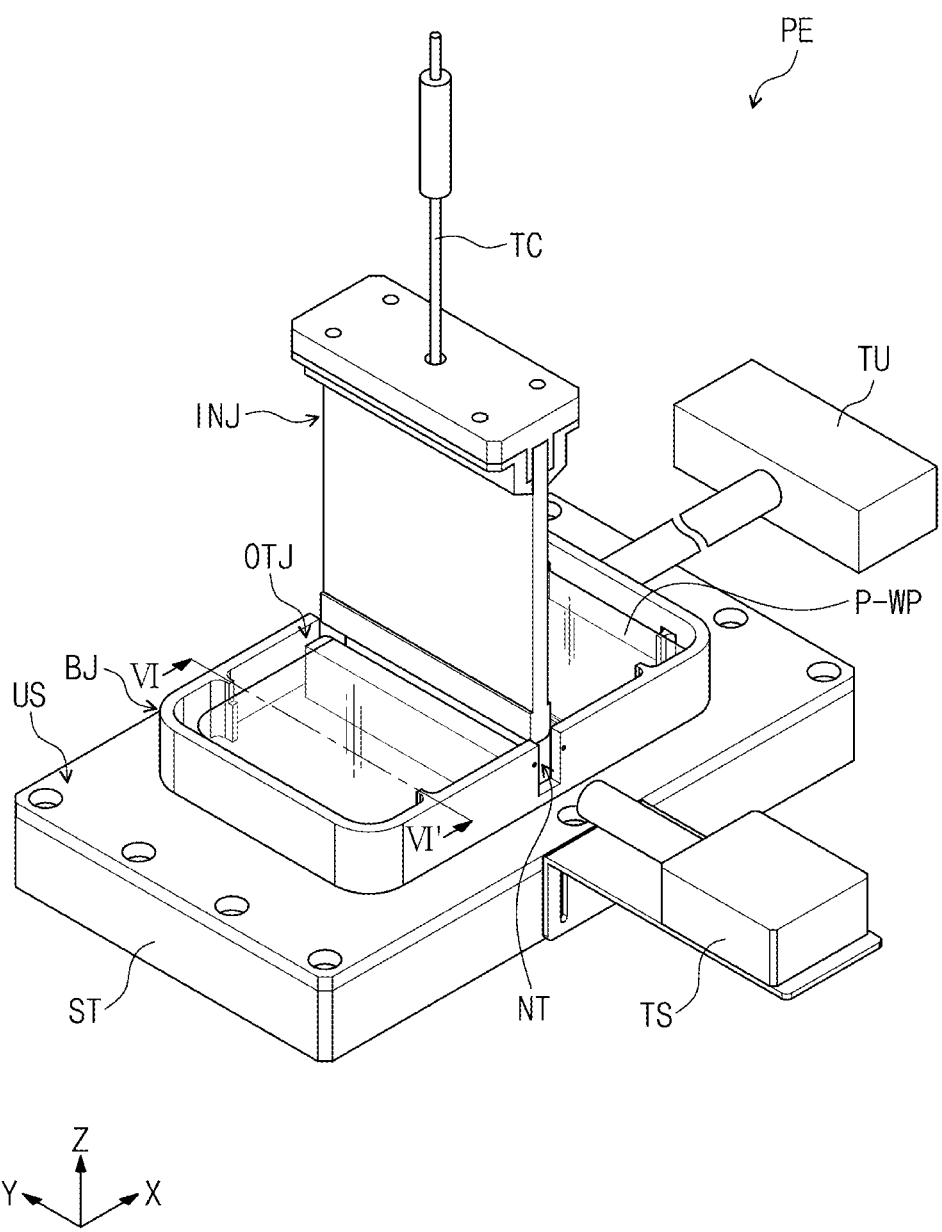
FIG. 8 is a perspective view illustrating a window molding apparatus according to an embodiment.
Figure 9A:
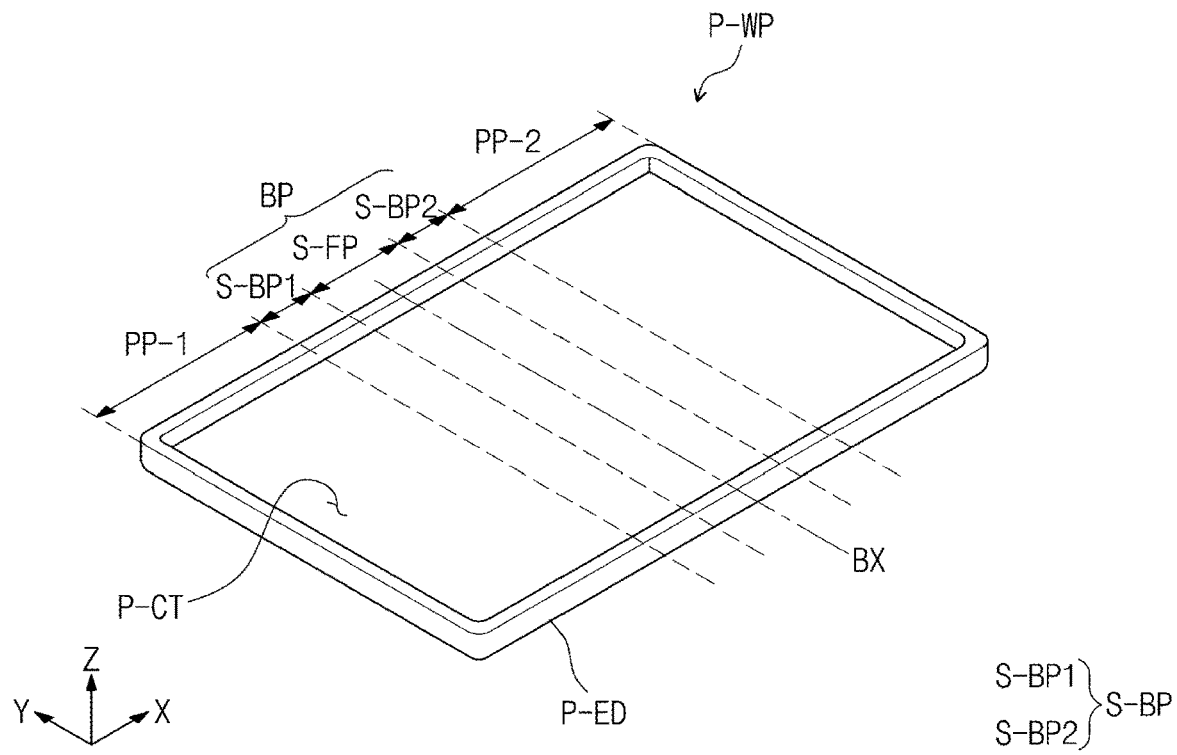
FIG. 9A is a perspective view illustrating a member to be processed, which is processed using a window molding apparatus according to an embodiment.
Figure 9B:
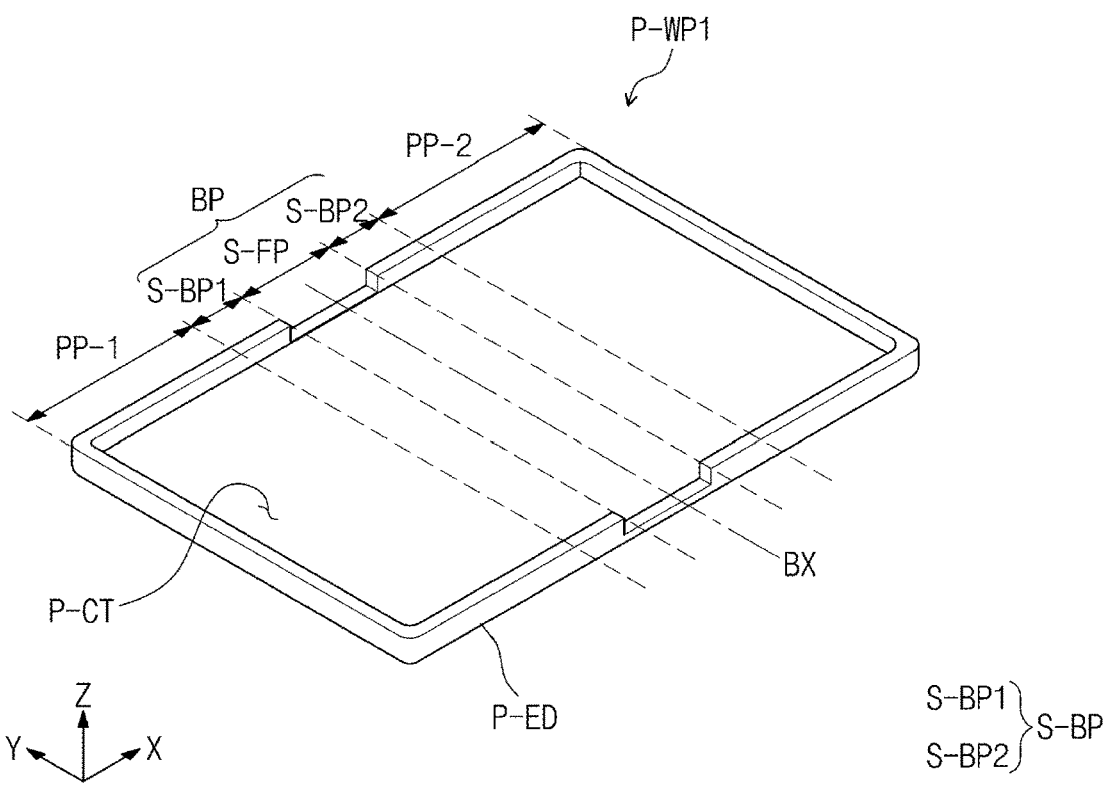
FIG. 9B is a perspective view illustrating a member to be processed, which is processed using the window molding apparatus according to an embodiment.

FIG. 8 is a perspective view illustrating a window molding apparatus according to an embodiment. FIGS. 9A and 9B are perspective views of a window to be processed, which is provided in the window molding apparatus, according to an embodiment.

Referring to FIG. 8, the window molding apparatus PE according to an embodiment may include an inner molding part INJ and an outer molding part OTJ disposed below the inner molding part INJ with a member P-WP to be processed (hereinafter, referred to as a processed member P-WP) therebetween. Also, the window molding apparatus PE may further include a base jig BJ on which the outer molding part OTJ is seated.

A ratio of the sizes of each of members in the window molding apparatus PE according to the embodiment illustrated in this specification is not limited to the illustrated rate. For example, the ratio of the height and width of the base jig BJ and the outer molding part OTJ, and the height ratio of the base jig BJ and an inner molding part INJ may be changed differently from the illustrated ratios.

Each of the processed members P-WP and P-WP1, which are illustrated in FIGS. 9A and 9B, correspond to a preliminary window that is a window before molding the window to be bent. Each of the processed members P-WP and P-WP1 processed by the window molding apparatus PE according to an embodiment may be a glass substrate. The glass substrate that is each of the processed members P-WP and P-WP1 may have a thickness of about 0.1 mm to about 1.0 mm. The window molding apparatus PE according to an embodiment may provide the window WP (see FIG. 2) that is bent at a bending angle greater than about 120° by processing each of the processed members P-WP and P-WP1, each of which is the glass substrate.

The processed members P-WP and P-WP1 may include a bent portion BP that is capable of being bent with respect to a bending axis BX and non-bent portions PP-1 and PP-2 spaced apart from each other with the bent portion BP therebetween. In addition, in one embodiment, the edge portion P-ED of each of the processed members P-WP and P-WP1, before being provided in the window molding apparatus PE, may be a portion bent from a side surface of a central portion P-CT. That is, each of the processed members P-WP and P-WP1 molded using the window molding apparatus PE may be processed to have a three-dimensional shape by bending the edge portion P-ED. The bent portion BP of each of the processed members P-WP and P-WP1 may include a first sub-bent portion S-FP and a second sub-bent portion S-BP, and the first sub-bent portion S-FP and the second sub-bent portion S-BP may be molded to have different curvature radii.

FIG. 9A illustrates the processed member P-WP, in which the edge portion P-ED is provided at a uniform height on the bent portion BP and the non-bent portions PP-1 and PP-2 according to the embodiment, and FIG. 9B illustrates the processed member P-WP1, in which the edge portion P-ED on the bent portion BP is provided at a height less than that of the edge portion P-ED on each of the non-bent portions PP-1 and PP-2, according to an embodiment.

In FIGS. 9A and 9B, each of the processed members P-WP and P-WP1 according to an embodiment may include the edge portion P-ED bent from each of four side surfaces of the central portion P-CT, the embodiment is not limited thereto. At least one of the plurality of edge portions P-ED of the processed members P-WP and P-WP1 may be provided without being bent so as to be disposed on the same plane as the central portion P-CT.

Referring again to FIG. 8, the window molding apparatus PE according to an embodiment may include the inner molding part INJ, the base jig BJ, and the outer molding part OTJ. The inner molding part CR may be controlled to operate in a vertical direction. Also, the inner molding part INJ may move toward a front or rear surface. In this specification, the control of the operation in the vertical direction refers to an operation in an upward (up) or downward (down) direction with respect to a Z-axis Z. Also, the movement toward the front or rear surface refers to movement along the Y-axis Y.

The inner molding part INJ may be controlled to operate in a vertical direction and be inserted into the outer molding part OTJ and also may move toward the front or rear surface and be removed from the outer molding part OTJ.

The window molding apparatus PE may include a support table ST, and the base jig BJ may be fixed on the support table ST. A top surface US of the support table ST on which the base jig BJ is disposed may be parallel to a plane defined by an X-axis X and a Y-axis Y. The Z-axis Z may indicate a normal direction to the plane defined by the X-axis X and the Y-axis Y.

Although not illustrated in the drawings, the window molding apparatus PE according to an embodiment may be disposed in a chamber (not illustrated). An inert gas may be provided into the chamber (not illustrated). For example, an N2 gas may be provided into the chamber (not illustrated). Also, the molding of the window may be performed by rising an atmosphere temperature within the chamber (not illustrated) through the window molding method that will be described later.

In the window molding apparatus PE according to an embodiment, the processed member P-WP may be supported by the base jig BJ. The processed member P-WP before the molding may be disposed between the inner molding part INJ and the outer molding part OTJ.

The window molding apparatus PE according to an embodiment may include a heating unit TU. The heating unit TU may be connected to the base jig BJ to provide heat to the base jig BJ. Alternatively, in an embodiment, the base jig BJ may be directly heated. Although not illustrated, the base jig BJ may include an induction heating coil (not illustrated).

The window molding apparatus PE according to an embodiment may further include a temperature sensor TS. The temperature sensor TS may be spaced apart from the base jig BJ and may be disposed at one side of the base jig BJ. However, the embodiment is not limited thereto, and the temperature sensor TS may be disposed adjacent to the base jig BJ. Alternatively, a plurality of temperature sensors TS may be disposed around the base jig BJ.

The temperature sensor TS may monitor a temperature of the base jig BJ. Although not illustrated in the drawing, the temperature sensor TS and the heating unit TU may be connected to each other through a control unit (not illustrated), and the temperature of the base jig BJ sensed by the temperature sensor TS may be used as an input value, and thus, a control unit (not illustrated) may control heat provided by the heating unit TU.

In the window molding apparatus PE according to an embodiment, the inner molding part INJ may be disposed above the processed member P-WP, and the outer molding part OTJ may be disposed below the processed member P-WP. In the window molding apparatus PE of an embodiment, the inner molding part INJ may mold a shape of a window inner surface WP-IS (see FIG. 2), and the outer molding part OTJ may mold a shape of a window outer surface WP-OS (see FIG. 2). The window WP (see FIG. 2) including the bent portion BP having the sub-bent portions having different curvature radius may be manufactured using the window molding apparatus PE including the inner molding part INJ and the outer molding part OTJ.

In the window molding apparatus PE according to an embodiment, each of the inner molding part INJ and the outer molding part OTJ may be made of graphite. In addition, the embodiment is not limited thereto, and each of the inner molding part INJ and the outer molding part OTJ may be not only graphite, but also silicon carbide, silicon nitride, molybdenum disilicide (MoSi2), aluminum oxide, aluminum nitride (AlN), zirconia, or tungsten carbide (WC). However, the embodiment is not limited thereto, and the outer surfaces of the inner molding part INJ and the outer molding part OTJ may be used without limitation as long as it is a material that is capable of being easily detached from the processed member P-WP after the molding process. In addition, outer surfaces of the inner molding part INJ and the outer molding part OTJ may be subjected to release treatment so as not to be bonded to the processed member P-WP.

Although not illustrated in the drawings, the window molding apparatus PE according to an embodiment may further include an operation controller (not illustrated) configured to control a vertical operation of the inner molding part INJ. The operation controller (not illustrated) may include a fixing part configured to fix an operation motor, which allows the inner molding part INJ to move in the vertical direction, or the inner molding part INJ. The operation controller (not illustrated) may be disposed on an upper portion of the inner molding part INJ or a side surface of the inner molding part INJ and then be connected to the inner molding part INJ.

Figure 10:
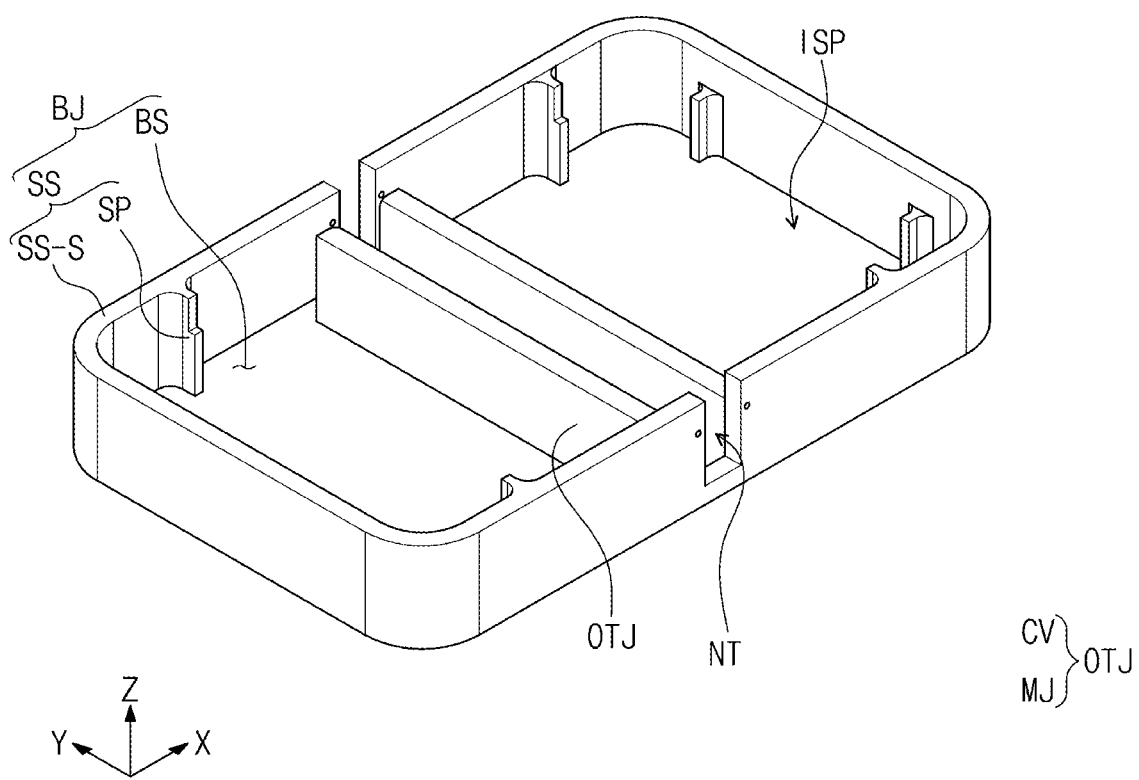
FIG. 10 is a perspective view illustrating a portion of the window molding apparatus according to an embodiment.
Figure 11:
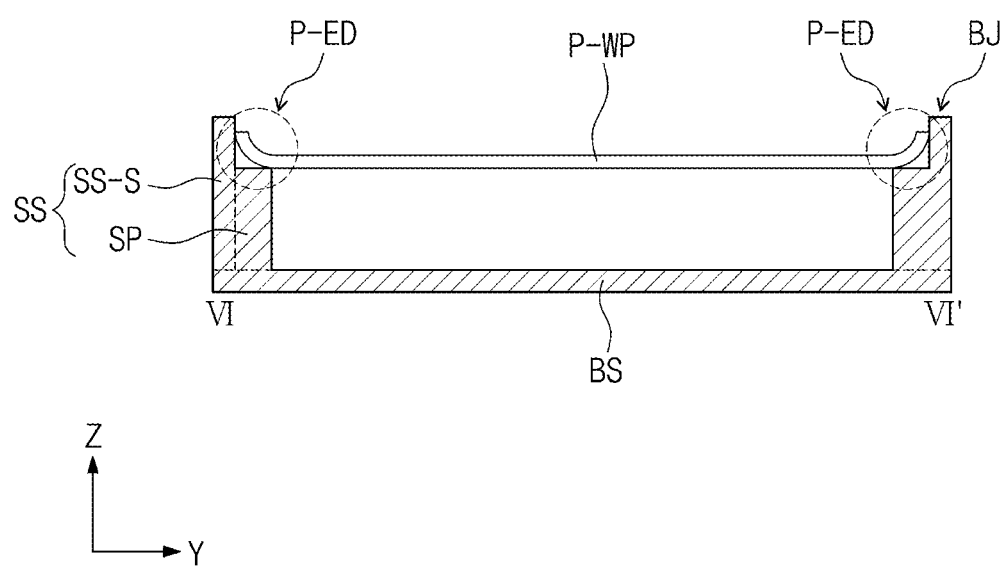
FIG. 11 is a cross-sectional view illustrating a portion of the window molding apparatus according to an embodiment.

FIG. 10 is a perspective view illustrating a portion of the window molding apparatus PE of FIG. 8, and FIG. 11 is a cross-sectional view taken along line VI-VI' of FIG. 8. Referring to FIGS. 10 and 11, the base jig BJ may include a bottom surface BS and a plurality of side surfaces SS. The plurality of side surfaces SS may be disposed on the bottom surface BS. The plurality of side surfaces SS may be provided in a state of being bent from the bottom surface BS, for example, the bottom surface BS and the side surfaces SS may be provided to be integrated with each other.

In an embodiment, the bottom surface BS may be parallel to a plane defined by the X-axis X and the Y-axis Y and may have a rectangular shape on the plane. The bottom surface BS on the plane may have a surface area larger than that of the processed member P-WP on the plane.

The side surfaces SS may be provided to extend from respective sides of the bottom surface BS having the rectangular shape, respectively. The outer molding part OTJ may be disposed in an inner space ISP defined by the four side surfaces SS, which are disposed to respectively correspond to the four sides of the bottom surface BS, and the bottom surface BS. In addition, the processed member P-WP may be disposed in the inner space ISP of the base jig BJ.

Each of the side surfaces SS may include a support portion SP on which the processed member P-WP is seated. The side surfaces SS may include a side support surface SS-S and a support portion SP protruding from the side support surface SS-S toward the inner space ISP. The processed member P-WP may be seated and supported on the support portion SP. Referring to FIG. 10, the outer molding part OTJ may be disposed in the inner space ISP of the base jig BJ. In addition, in an embodiment, the outer molding part OTJ may be fixed on the base jig BJ. However, the embodiment is not limited thereto, and the outer molding part OTJ may be changed and replaced according to the molded shape of the processed member.

A notch NT may be provided in each of side surfaces SS of the base jig BJ. The notch NT may be provided corresponding to a portion at which the outer molding part OTJ is disposed. The shape of the notch NT may correspond to a shape of a core molding part CRP (see FIG. 14) of the inner molding part described later. After molding the window, the inner molding part INJ (see FIG. 8) may be easily removed through the notch NT provided in each of the side surfaces SS of the base jig BJ. A width of the notch NT in the direction of the X-axis X may be greater than or equal to a width of the core molding part CRP (see FIG. 14) in the direction of the X-axis X. That is, in the window molding apparatus PE according to an embodiment, the notch NT may be defined in each of the side surfaces SS of the base jig BJ to easily perform the molding using the inner molding part INJ and the outer molding part OTJ even if the processed member P-WP has the three-dimensional shape that is bent from the edge portion P-ED, and also, the inner molding part INJ may be easily removed without being limited in the three-dimensional shape of the processed member P-WP, which is molded, after the molding process.

In this specification, the outer molding part OTJ is illustrated as being disposed at a center of the base jig BJ, but the embodiment is not limited thereto. In an embodiment, the outer molding part OTJ may be disposed to be biased toward one side of the base jig BJ, and thus, a position of the bent portion BP (see FIG. 9A) of the processed member P-WP may be changed.

Figure 12:
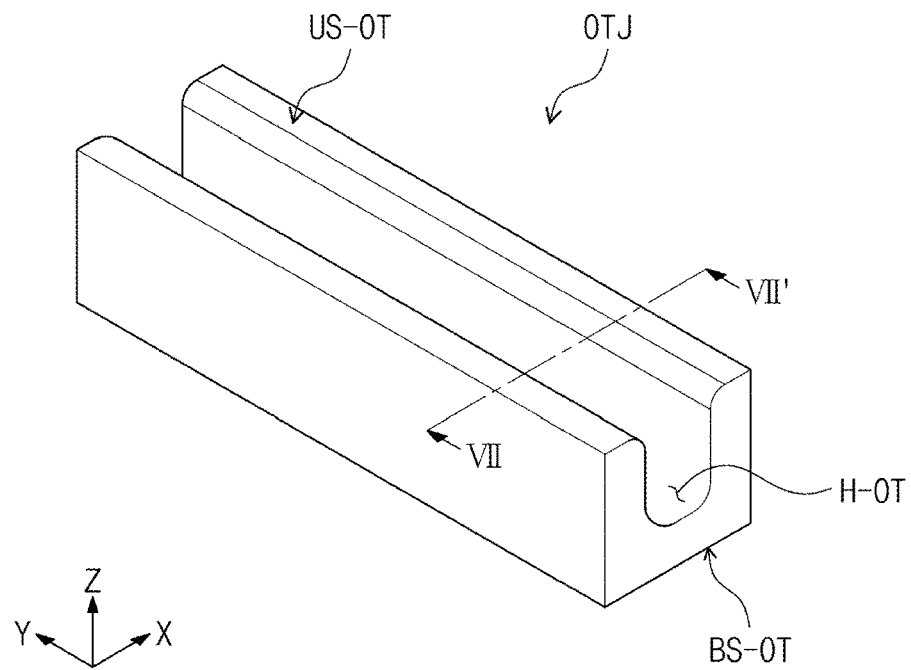
FIG. 12 is a perspective view illustrating an outer molding part according to an embodiment.
Figure 13:
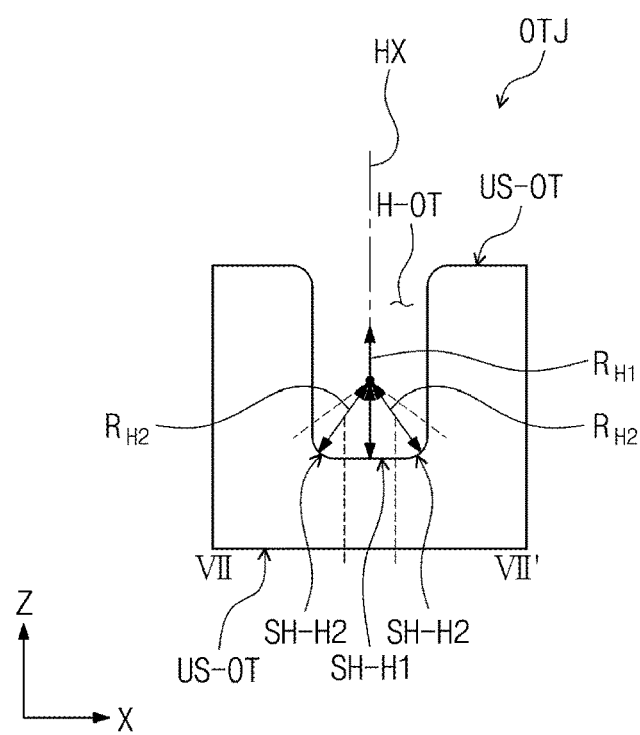
FIG. 13 is a cross-sectional view illustrating the outer molding part according to an embodiment.

FIG. 12 is a perspective view illustrating the outer molding part according to an embodiment, and FIG. 13 is a cross-sectional view illustrating the outer molding part according to an embodiment. FIG. 13 is a cross-sectional view taken along line II-IF of FIG. 12. A groove H-OT may be defined in the outer molding part OTJ according to an embodiment, which is provided in the window molding apparatus according to an embodiment. The outer molding part OTJ may include a lower surface BS-OT and an upper surface US-OT facing the lower surface BS-OT, and the groove H-OT may be defined to be recessed from the upper surface US-OT toward the lower surface BS-OT.

The groove H-OT may be a portion defined by a plurality of sub-groove surfaces. The outer molding part OTJ may include a first sub-groove surface SH-1 and a second sub-groove surface SH-2, which define the groove H-OT. The first sub-groove surface SH-1 may be adjacent to the lower surface BS-OT, and the second sub-groove surface SH-2 may be adjacent to the first sub-groove surface SH-1 and defined to extend from the lower surface BS-OT toward the upper surface US-OT.

The first sub-groove surface SH-1 and the second sub-groove surface SH-2 may have different curvature radii. The curvature radius of each of the sub-groove surfaces may be defined with respect to a virtual curvature center HX defined inside the groove H-OT. A curvature radius RH2 of the second sub-groove surface SH-2 may be less than a curvature radius RH1 of the first sub-groove surface SH-1. For example, the first sub-groove surface SH-1 may be a flat surface, and the second sub-groove surface SH-2 may be a curved surface having the curvature radius RH2 with respect to the curvature center HX.

In the embodiment illustrated in FIGS. 12 and 13, only the first sub-groove surface SH-1 and the second sub-groove surface SH-2, which have the different curvature radii, are illustrated, but the embodiment is not limited thereto. For example, the outer molding part OTJ may include three or more sub-groove surfaces having different curvature radii. Also, in FIGS. 12 and 13, the second sub-groove surfaces SH-2 having a same curvature radius are disposed on both sides of the first sub-groove surface SH-1 with the first sub-groove surface SH-1 therebetween, but the embodiment is not limited thereto. For example, the second sub-groove surfaces SH-2 disposed on both the sides of the first sub-groove surface SH-1 with the first sub-groove surface SH-1 therebetween may have different curvature radii.

Figure 14:
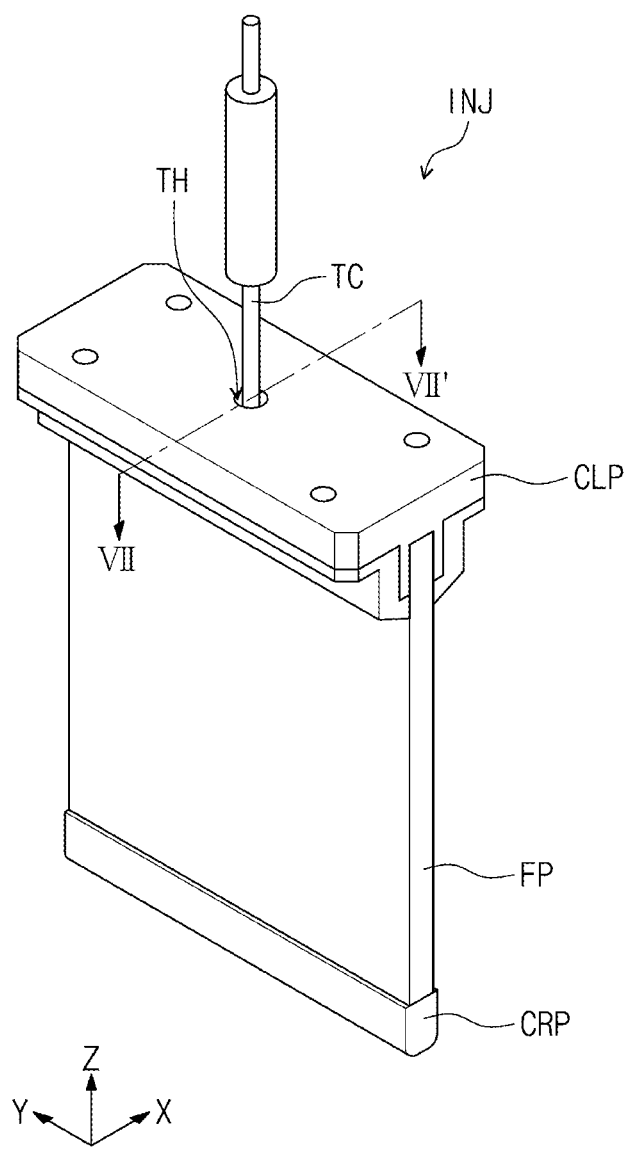
FIG. 14 is a perspective view illustrating an inner molding part according to an embodiment.
Figure 15:
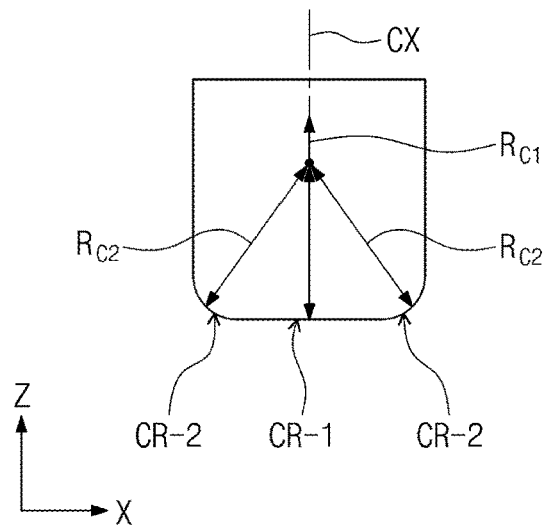
FIG. 15 is a cross-sectional view illustrating the inner molding part according to an embodiment.
Figure 16:
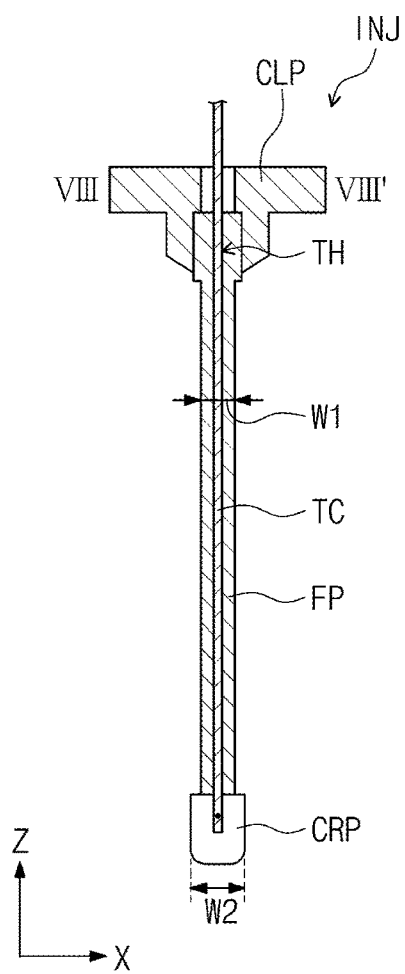
FIG. 16 is a cross-sectional view illustrating an inner molding part according to an embodiment.

FIG. 14 is a perspective view illustrating the inner molding part provided in the window molding apparatus according to an embodiment. FIG. 15 is a cross-sectional view illustrating a portion of the inner molding part, and FIG. 16 is a cross-sectional view illustrating the inner molding part provided in the window molding apparatus. FIG. 16 is a cross-sectional view taken along line VIII-VIII' of FIG. 14.

Referring to FIG. 14, the inner molding part INJ according to an embodiment may include a flat molding part FP and a core molding part CRP. The core molding part CRP may be disposed at one end of the flat molding part FP. That is, the flat molding part FP may be disposed on the core molding part CRP.

In an embodiment, the flat molding part FP may be a portion provided to be separated from the core molding part CRP. For example, the core molding part CRP may be changed according to the processed shape of the bent portion of the processed member and thus may be coupled to the flat molding part FP. Also, unlike this, the flat molding part FP may be provided to be integrated with the core molding part CRP. In this case, the entire flat molding part FP and the entire core molding part CRP, which are provided to be integrated with each other, may be changed according to the processed shape of the bent portion of the processed member.

The inner molding part INJ may further include a fixing jig CLP. The flat molding part FP may be picked up and fixed through the fixing jig CLP.

FIG. 15 is a cross-sectional view of the core molding part CRP. The core molding part CRP may include a plurality of sub-bottom surfaces CR-1 and CR-2 having different curvature radii. In the inner molding part, the flat molding part FP (see FIG. 14) may be disposed on the core molding part CRP to be spaced apart from the sub-bottom surfaces CR-1 and CR-2.

The core molding part CRP may include a first sub-bottom surface CR-1 and a second sub-bottom surface CR-2 adjacent to the first sub-bottom surface CR-1. The first sub-bottom surface CR-1 and the second sub-bottom surface CR-2 may have different curvature radii. The curvature radius of the sub-bottom surfaces may be defined with respect to a virtual curvature center CX disposed inside the core molding part CRP. A curvature radius RC2 of the second sub-bottom surface CR-2 may be less than a curvature radius RC1 of the first sub-bottom surface CR-1. For example, the first sub-bottom surface CR-1 may be a flat surface, and the second sub-bottom surface CR-2 may be a curved surface having a curvature radius RC2 with respect to the curvature center CX.

In the embodiment illustrated in FIG. 15, only the first sub-bottom surface CR-1 and the second sub-bottom surface CR-2, which have the different curvature radii, are illustrated, but the embodiment is not limited thereto. For example, the outer molding part OTJ may include three or more sub-bottom surfaces having different curvature radii. Also, in FIG. 15, the second sub-bottom surfaces CR-2 having the same curvature radius are disposed on both sides of the first sub-bottom surface CR-1 with the first sub-bottom surface CR-1 therebetween, but the embodiment is not limited thereto. For example, the second sub-bottom surfaces CR-2 disposed on both the sides of the first sub-bottom surface CR-1 with the first sub-bottom surface CR-1 therebetween may have different curvature radii.

Referring to FIGS. 13 and 15, the first sub-bottom surface CR-1 and the second sub-bottom surface CR-2 of the core molding part CRP may have shapes corresponding to a first sub-groove surface SH-1 and a second sub-groove surface SH-2 of the outer molding part OTJ, respectively. For example, the first sub-bottom surface CR-1 and the first sub-groove surface SH-1 corresponding thereto may be portions including flat surfaces, and the second sub-bottom surface CR-2 and the corresponding second sub-groove surface SH-2 corresponding thereto may be curved portions.

A curvature radius RC1 of the first sub-bottom surface CR-1 may be less than a curvature radius RH1 of the first sub-groove surface SH-1, and a curvature radius RC2 of the second sub-bottom surface CR-2 may be less than a curvature radius RH2 of the second sub-groove surface SH-2. Each of the curvature radius RC1 of the first sub-bottom surface CR-1 and the curvature radius RH1 of the first sub-groove surface SH-1 may be about 1 mm or more and about 10 mm or less, and each of the curvature radius RC2 of the second sub-bottom surface CR-2 and the curvature radius RH2 of the second sub-groove surface SH-2 may be about 4 mm or less.

An average roughness of an outer surface of the core molding part CRP that is in contact with the processed member may be about 10 A or less. For example, the core molding part CRP may have an average roughness of about 2 A to about 5 A. In this specification, the surface roughness represents arithmetic average roughness. In the window molding apparatus according to an embodiment, because the average roughness of the core molding part CRP that is in direct contact with the processed member is about 10 A or less, a surface of the window inner surface WP-IS (see FIG. 2) may have a good average roughness value at which an additional polishing process is not required.

FIG. 16 is a cross-sectional view of the inner molding part INJ according to an embodiment. Referring to FIGS. 14 and 16, in an embodiment, a through-hole TH may be defined in the inner molding part INJ, and a heating member TC may be disposed to be inserted in the through-hole TH. The through-hole TH may be defined by passing through the flat molding part FP and extending to the core molding part CRP. The heating member TC may be disposed inside the flat molding part FP and the core molding part CRP along the through-hole TH. Heat may be provided to the inner molding part INJ by using the heating member TC. For example, the core molding part CRP may be heated by the heat transmitted through the heating member TC, and the heated core molding part CRP may be in contact with the processed member P-WP to transfer the heat to the processed member WP, thereby molding the bent portion BP (see FIG. 9A).

Unlike the illustrated drawings, the inner molding part INJ may not include the heating member TC. The processed member P-WP may be molded by heat provided by the outer molding part.

In an embodiment, a width W2 of the core molding part CRP in the direction of the X-axis X direction may be greater than a width W1 of the flat molding part FP in the direction of the X-axis X axis on the cross-section parallel to the plane defined by the X-axis X and the Z-axis Z. Because the core molding part CRP of the inner molding part INJ has the width greater than that of the flat molding part FP, the bent portion BP (see FIG. 9A) may be easily molded without an interference with the non-bent portions PP-1 and PP-2 (see FIG. 9A).

Figure 17:
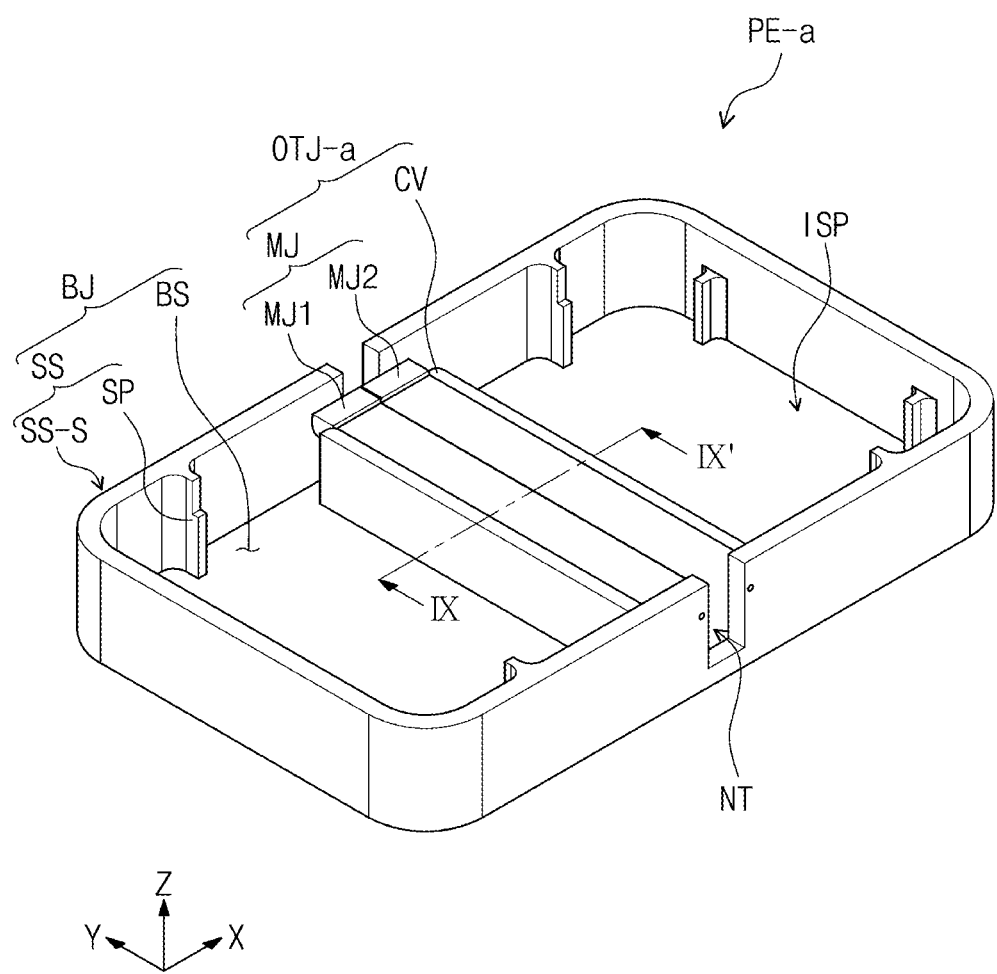
FIG. 17 is a perspective view illustrating a portion of the window molding apparatus according to an embodiment.

FIG. 17 is a perspective view illustrating a portion of the window molding apparatus according to an embodiment; FIG. 17 illustrates only an outer molding part OTJ-a and a base jig JB except for the inner molding part. In a window molding apparatus PE-a according to an embodiment, the outer molding part OTJ-a may include a cavity mold CV and a movable mold MJ. The movable mold MJ may be disposed on the cavity mold CV.

Figure 18:
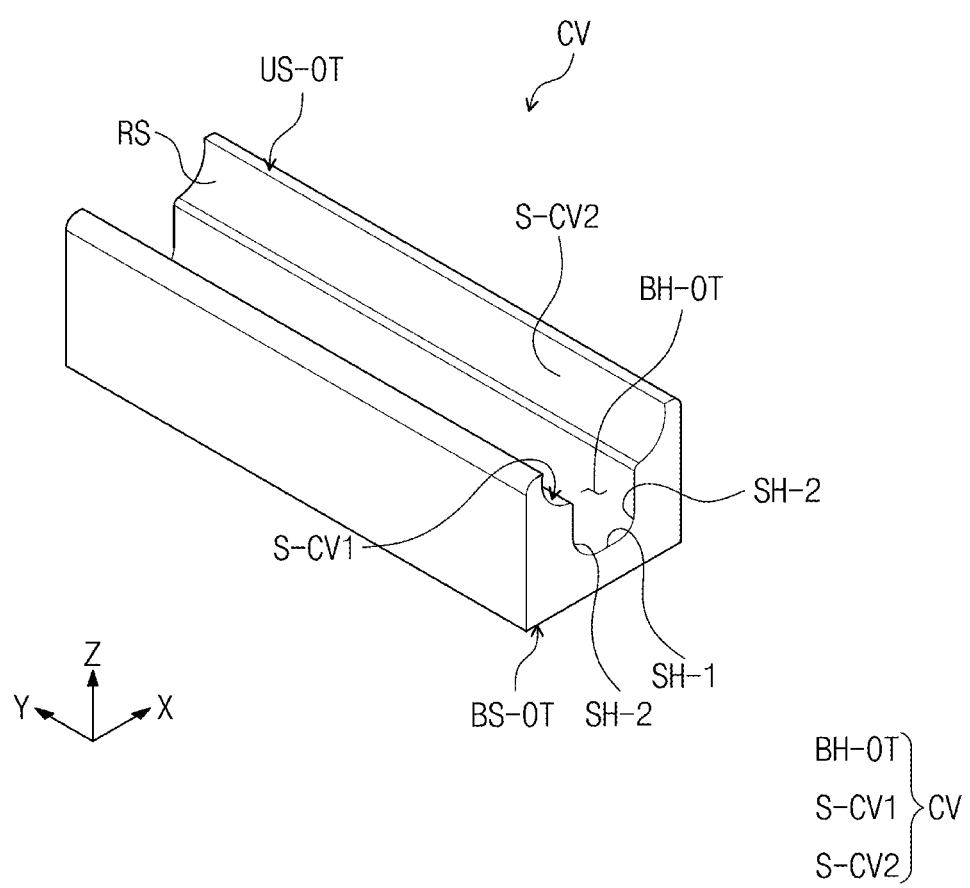
FIG. 18 is a perspective view illustrating an outer molding part according to an embodiment.

FIG. 18 is a perspective view illustrating the cavity mold CV provided in the outer molding part OTJ-a according to an embodiment. Referring to FIG. 18, the cavity mold CV constituting the outer molding part OTJ-a may include a lower surface BS-OT and an upper surface US-OT, which faces the lower surface BS-OT, and a groove H-OT may be defined in the cavity mold CV. The groove H-OT may be defined to be recessed from the upper surface US-OT toward the lower surface BS-OT.

In an embodiment, the groove H-OT may include a lower groove portion BH-OT and a plurality of sub-cavities S-CV1 and S-CV2, each of which is defined to extend from the lower groove portion BH-OT toward the upper surface US-OT and have a curved surface. The lower groove portion BH-OT may be defined as a first sub-groove surface SH-1 and a second sub-groove surface SH-2 adjacent to the first sub-groove surface SH-1. For the first sub-groove surface SH-1 and the second sub-groove surface SH-2, the same contents as those described for the outer molding part OTJ (see FIG. 13) with reference to FIG. 13 may be applied.

The first sub-groove surface SH-1 and the second sub-groove surface SH-2, which define the lower groove portion BH-OT, may have different curvature radii. The curvature radius of the second sub-groove surface SH-2 may be less than that of the first sub-groove surface SH-1. For example, the first sub-groove surface SH-1 may include a flat surface, and the second sub-groove surface SH-2 may include a curved surface. The plurality of sub-cavities S-CV1 and S-CV2 may be defined in the lower groove portion BH-OT and may be defined to have a curved surface RS that is recessed toward the lower surface BS-OT.

Figure 19:
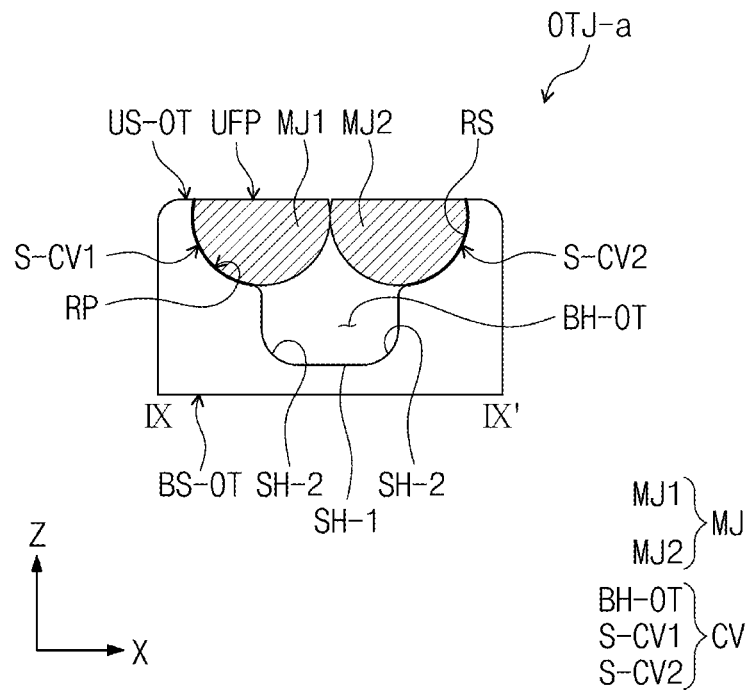
FIG. 19 is a cross-sectional view illustrating an outer molding part according to an embodiment.
Figure 20:
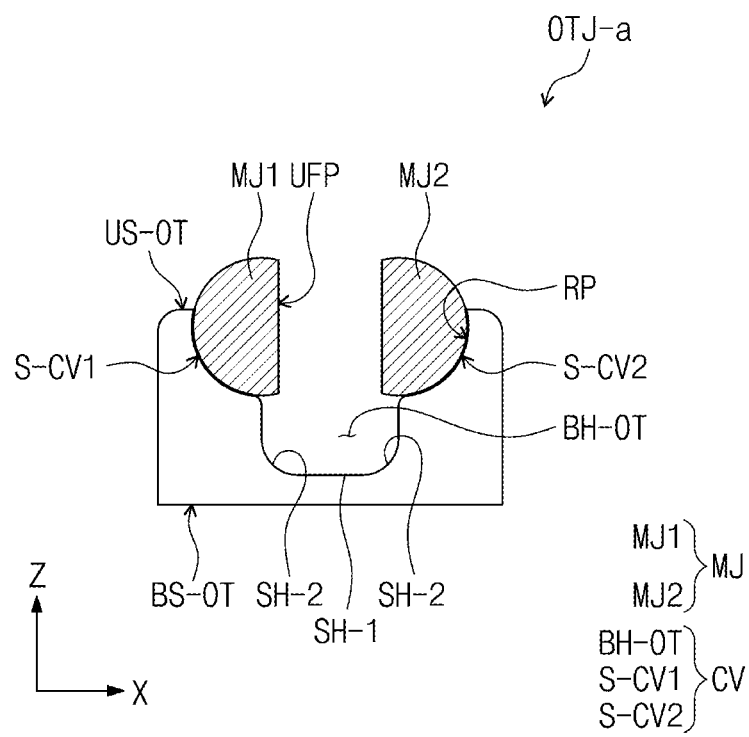
FIG. 20 is a cross-sectional view illustrating an outer molding part according to an embodiment.

FIGS. 19 and 20 are cross-sectional views illustrating the outer molding part according to an embodiment. FIG. 19 is a cross-sectional view taken along line IX-IX' of FIG. 17.

Referring to FIGS. 19 and 20, the movable molds MJ1 and MJ2 may be respectively seated in the sub-cavities S-CV1 and S-CV2 to move along curved surfaces of the sub-cavities S-CV1 and S-CV2. Also, unlike this, the movable molds MJ1 and MJ2 may be fixed and supported on separate external fixed shafts (not illustrated). That is, the movable molds MJ1 and MJ2 may rotate according to rotation of the fixed shafts (not illustrated). Each of the movable molds MP and MJ2 may include a curved mold part RP and a flat mold part UFP. The curved mold part RP may have a curved surface corresponding to the curved surface RS of each of the sub-cavities S-CV1 and S-CV2. A curvature radius of the curved mold part RP of each of the movable molds MJ1 and MJ2 may correspond to a curvature radius of the curved surface RS of each of the sub-cavities S-CV1 and S-CV2. The curvature radius of the curved mold part RP may be less than or equal to the curvature radius of the curved surface RS of each of the sub-cavities S-CV1 and S-CV2.

The outer molding part OTJ-a may include a first sub-cavity S-CV1 and a second sub-cavity S-CV2, which are symmetrical to be defined with respect to the lower groove portion BH-OT. In addition, the outer molding part OTJ-a may include a first movable mold MJ1 disposed in the first sub-cavity S-CV1 and a second movable mold MJ2 disposed in the second sub-cavity S-CV2.

The movable molds MJ1 and MJ2 may be controlled in operation so that the flat mold part UFP is disposed parallel to the lower surface BS-OT of the outer molding part in a first state, and the flat mold part UFP is disposed to be perpendicular to the lower surface BS-OT of the outer molding part in a second state. FIG. 19 is a cross-sectional view illustrating an example of the first state, and FIG. 20 is a cross-sectional view illustrating an example of the second state. In FIGS. 19 and 20, the processed member will be omitted to illustrate an operation of the window molding apparatus.

FIGS. 19 and 20 illustrates the window molding apparatus except for the processed member, but in the first state illustrated in FIG. 19, the processed member may be disposed on the outer molding part OTJ in a state in which the first non-bent portion PP-1 (see FIG. 9A), the bent portion BP (see FIG. 9A), and the second non-bent portion PP-2 (see FIG. 9A) are flat. Hereinafter, in this specification, in the first state, the first non-bent portion PP-1 (see FIG. 9A), the bent portion BP (see FIG. 9A), and the second non-bent portion PP-2 (see FIG. 9A) are described as being disposed in the flat state on the same plane. In the first state, the processed member P-WP (see FIG. 9A) may be disposed in a state of being supported by the flat mold part UFP.

In the second state illustrated in FIG. 20, a portion of the processed member P-WP (see FIG. 9A) may be inserted into the cavity mold CV in a state in which the bent portion BP (see FIG. 9A) of the processed member P-WP is concavely bent into the lower groove portion BH-OT. Hereinafter, in this specification, the second state is described in a state in which the first non-bent portion PP-1 (see FIG. 9A) and the second non-bent portion PP (see FIG. 9A) are bent to face each other with the bent portion BP (see FIG. 9A) of the processed member P-WP. The first non-bent portion PP-1 (see FIG. 9A) and the second non-bent portion PP-2 (see FIG. 9A) may be disposed to face each other between the flat mold parts UFP of the movable molds MJ1 and MJ2 facing each other in the second state.

Referring to FIGS. 19 and 20, in the first state, the two movable molds MJ1 and MJ2 may be disposed adjacent to each other so that the flat mold part UFP is parallel to the lower surface BS-OT of the outer molding part. That is, in the first state, the first movable mold MJ1 and the second movable mold MJ2 may be disposed adjacent to each other below the processed member. In the first state, the flat mold parts UFP of the first movable mold MJ1 and the second movable mold MJ2 may be disposed parallel to each other. That is, in the first state, the bent portion BP (see FIG. 9A) of the processed member may be disposed to overlap the first movable mold MJ1 and the second movable mold MJ2 adjacent to each other.

Also, in the two movable molds MJ1 and MJ2 in the second state, the flat mold parts UFP may be disposed perpendicular to the lower surface BS-OT of the outer molding part. That is, in the second state, the first movable mold MJ1 and the second movable mold MJ2 may move so that the flat mold parts UFP face each other and thus may be disposed on the first and second sub-cavities S-CV1 and S-CV2. In the second state, the first movable mold MJ1 and the second movable mold MJ2 may be spaced apart from each other to face each other with the first non-bent portion PP-1 (see FIG. 9A) and the second non-bent portion PP-2 (see FIG. 9A) therebetween. In the second state, the flat mold parts UFP of the first movable mold MJ1 and the second movable mold MJ2 may be disposed perpendicular to the lower surfaces BS-OT. In addition, although not illustrated, the inner molding part INJ (see FIG. 8) between the first non-bent portion PP-1 (see FIG. 9A) and the second non-bent portion PP-2 (see FIG. 9A) facing each other in the second state may be disposed.

The embodiment is not limited thereto, and in the second state, the flat mold parts UFP of the movable molds MJ1 and MJ2 may be disposed to face each other with the processed member P-WP (see FIG. 9A) therebetween. Here, each of the flat mold parts UFP may not be angled at about 90 degrees with respect to the lower surface BS-OT of the outer molding part. In the second state, an inclination angle of the flat mold parts UFP of the two movable molds MJ1 and MJ2 facing each other with respect to the lower surface BS-OT may not be limited to about 90 degrees. That is, the flat mold parts UFP of the two movable molds MJ1 and MJ2 facing each other may be changed in a range in which the flat mold parts UFP are maintained to be spaced apart from the processed member P-WP (see FIG. 9A) while face each other.

Unlike the illustrated example, in the window molding apparatus according to an embodiment, four or more sub-cavities may be defined in the outer molding part OTJ-a. Also, in this case, the window molding apparatus according to an embodiment may include four or more movable molds disposed in the four or more sub-cavities in the outer molding part OTJ-a.

The window molding apparatus according to an embodiment may include an inner molding part and an outer molding part. Here, the inner molding part may include a core molding part including sub-bottom surfaces having different curvature radii, and the outer molding part may include a groove defined by a plurality of sub-groove surfaces to manufacture a window including sub-bent portions having different curvature radii on the bent portion. The window molding apparatus according to an embodiment may include an inner molding part including sub-bottom surfaces having different curvature radii and an outer molding part including a plurality of sub-groove surfaces to bend the inside and outside of the window at the same time. The window molding apparatus may be used to mold the window including the bent portion having a variable curvature radius. In addition, the window molding apparatus according to an embodiment may be used to manufacture a window that is bent at an angle of about 180° with improved dimensional stability and window surface quality by simultaneously molding inner and outer surfaces of the window. The window manufactured by the window molding apparatus according to an embodiment may include sub-bent portions having different curvature radii on the bent portion to provide a grip property and a touch property to a user.

Hereinafter, a window molding method according to an embodiment will be described with reference to FIGS. 21 to 26. The window molding method, which will be described later, according to an embodiment may correspond to a window molding method using the window molding apparatus according to the foregoing embodiment. Hereinafter, in the description of the wind molding method according to an embodiment, contents duplicated with the description of the window molding apparatus according to the forgoing embodiment will not be described again, and differences therebetween will be mainly described.

Figure 21:
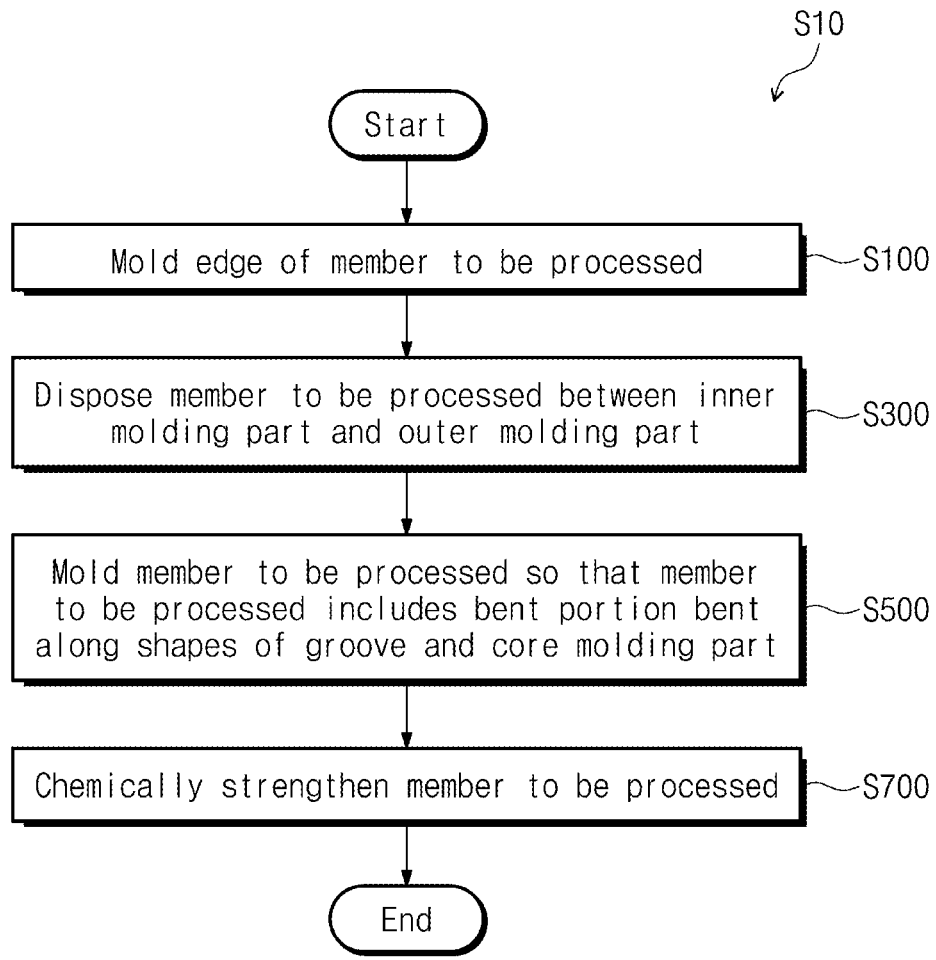
FIG. 21 is a flowchart illustrating a window molding method according to an embodiment.
Figure 22:
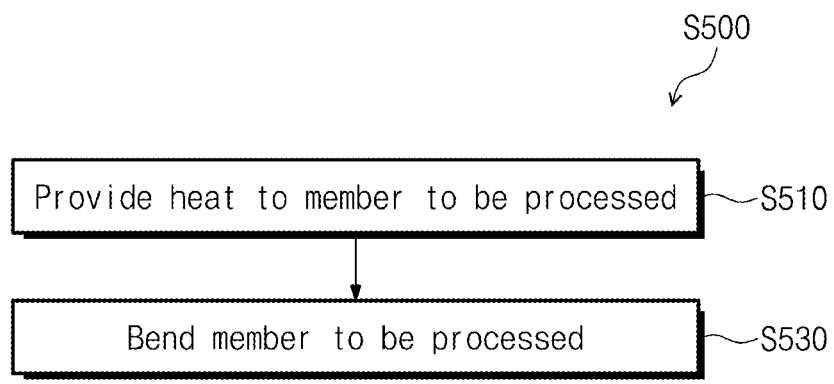
FIG. 22 is a flowchart illustrating one process of the window molding method according to an embodiment.

FIG. 21 is a flowchart illustrating a window molding method according to an embodiment. FIG. 22 is a flowchart illustrating one process of the window molding method of FIG. 21 according to an embodiment. FIGS. 23 to 29 schematic views illustrating processes of the window molding method according to an embodiment.

The window molding method according to an embodiment may be performed using the window molding apparatus according to the above-described embodiment including the inner molding part INJ and the outer molding part OTJ.

A window molding method (S10) according to an embodiment may include a process (S300) of disposing a processed member between an inner molding part and an outer molding part and a process (S500) of molding the processed member so that the processed member includes a groove and a bent portion that is bent along a curved surface of a core molding part. The window molding method (S10) according to an embodiment may further include a process (S100) of molding an edge of the processed member before the process (S300) of disposing the processed member between the inner molding part and the outer molding part. The window molding method (S10) according to an embodiment may further include a process (S700) of chemically strengthening the processed member.

Figure 23:
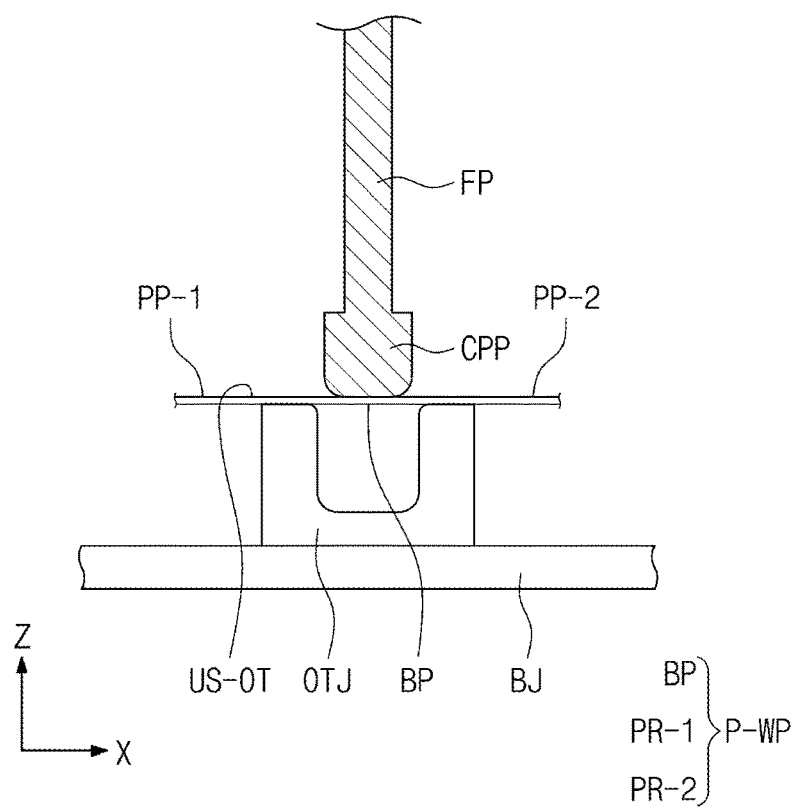
FIG. 23 is a view illustrating a portion of processes of the window molding method according to an embodiment.

FIG. 23 is a schematic view illustrating the process (S300) of disposing the processed member between the inner molding part and the inner molding part. The bent portion BP of the processed member P-WP may be disposed between an upper surface US-OT of the outer molding part OTJ and a core molding part CRP of the inner molding part INJ. The processed member P-WP may be disposed between the inner molding part INJ and the outer molding part OTJ in a flat state.

In the window molding method (S10) according to an embodiment, the process (S500) of molding the processed member may include a process (S510) of providing heat to the processed member and a process (S530) of bending the processed member. The process (S530) of bending the processed member may be a process of bending the processed member so that the bent portion of the processed member includes a first sub-bent portion S-FP (see FIG. 9A) and a second sub-bent portion S-BP (see FIG. 9A), which have different curvature radii, and the processed member includes a first non-bent portion PP-1 (see FIG. 9A) and a second bent-portion PP-2 (see FIG. 9A) with the bent portion therebetween.

The process (S510) of providing the heat to the processed member may include a process of providing the heat to at least one of the inner molding part or the outer molding part. The process (S510) of providing the heat to the processed member may include a process of heating the processed member by providing the heat to at least one of the inner molding part or the outer molding part. The processed member may be heated to a temperature having viscoelasticity by the heat provided in the process (S510) of providing the heat to the processed member. For example, in the process (S510) of providing the heat to the processed member, viscosity of a glass substrate may decrease in a range of about 10' poises to about $10^9$ poises by the heat provided from at least one of the inner molding part or the outer molding part.

In an embodiment, in the process (S510) of providing the heat to the processed member, the temperature of the processed member may be heated to about 550° C. or more by the heat provided from at least one of the inner molding part or the outer molding part. However, the embodiment of the inventive concept is not limited thereto. The processed member, which is the glass substrate, may be thermally molded through the processes including the process (S510) of providing the heat to the processed member.

Figure 24:
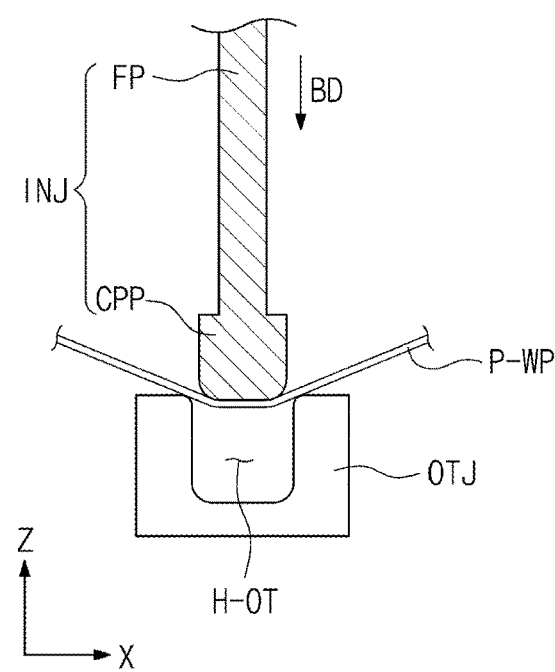
FIG. 24 is a view illustrating a portion of the processes of the window molding method according to an embodiment.
Figure 25:
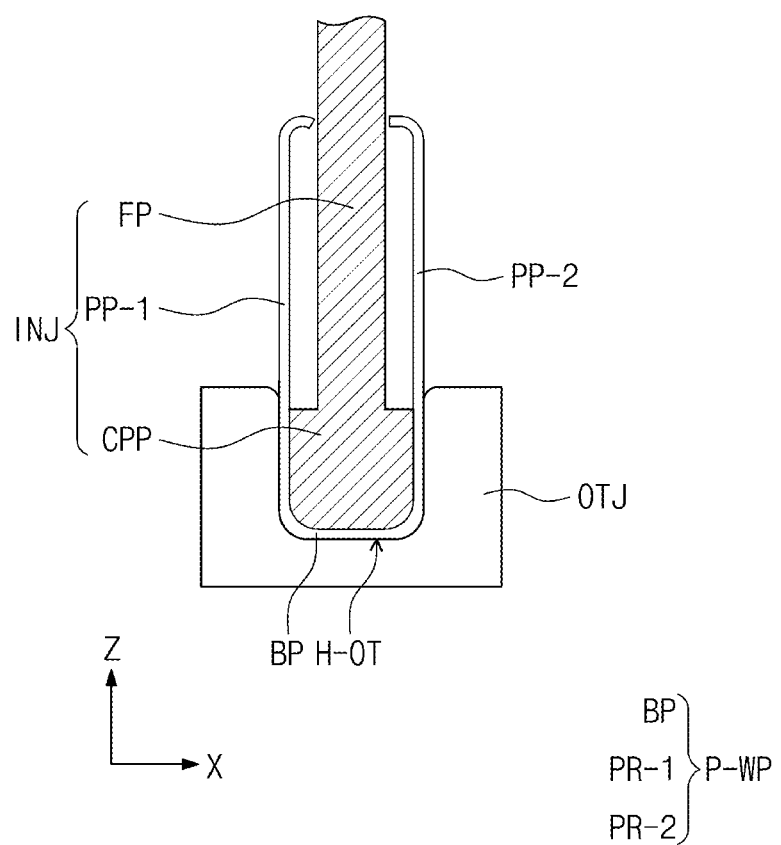
FIG. 25 is a view illustrating a portion of the processes of the window molding method according to an embodiment.

FIGS. 24 and 25 are schematic views illustrating a portion of the process (S500) of molding the processed member.

FIG. 24 illustrates an intermediate process in which the processed member P-WP is changed from a first state that is in a flat state into a second state that is in a bent state. The inner molding part INJ may move in a downward direction BD, which is a direction of the outer molding part OTJ, and the core molding part CRP and the processed member P-WP of the inner molding part INJ may be inserted into a groove H-OT of the outer molding part.

The inner molding part INJ may move in the downward direction BD by its own weight. In an embodiment, the inner molding part INJ may be additionally pressed in addition to its own weight. That is, in the window molding method according to an embodiment, the inner molding part INJ may move in the downward direction BD by a pressure provided from a separate pressing member to bend the processed member P-WP.

FIG. 25 illustrates a state in which the processed member P-WP is bent to be inserted into the groove H-OT. The inner molding part INJ and the processed member P-WP may be inserted into the groove H-OT of the outer molding part OTJ, and the non-bent portions PP-1 and PP-2 may face each other with the flat molding part FP of the inner molding part INJ therebetween. Also, the bent portion BP of the processed member P-WP may be molded according to a shape of the groove H-OT of the core molding part CRP and the outer molding part OTJ.

In the embodiment illustrated in FIG. 25, an edge portion P-ED of the processed member P-WP may be bent toward the inner surface. After the edge portion P-ED is bent toward the inner molding part INJ to mold the processed member P-WP, the inner molding part INJ may be removed to a front or rear surface of the window molding apparatus, but not an upper side through which the inner molding part INJ is inserted.

Figure 26:
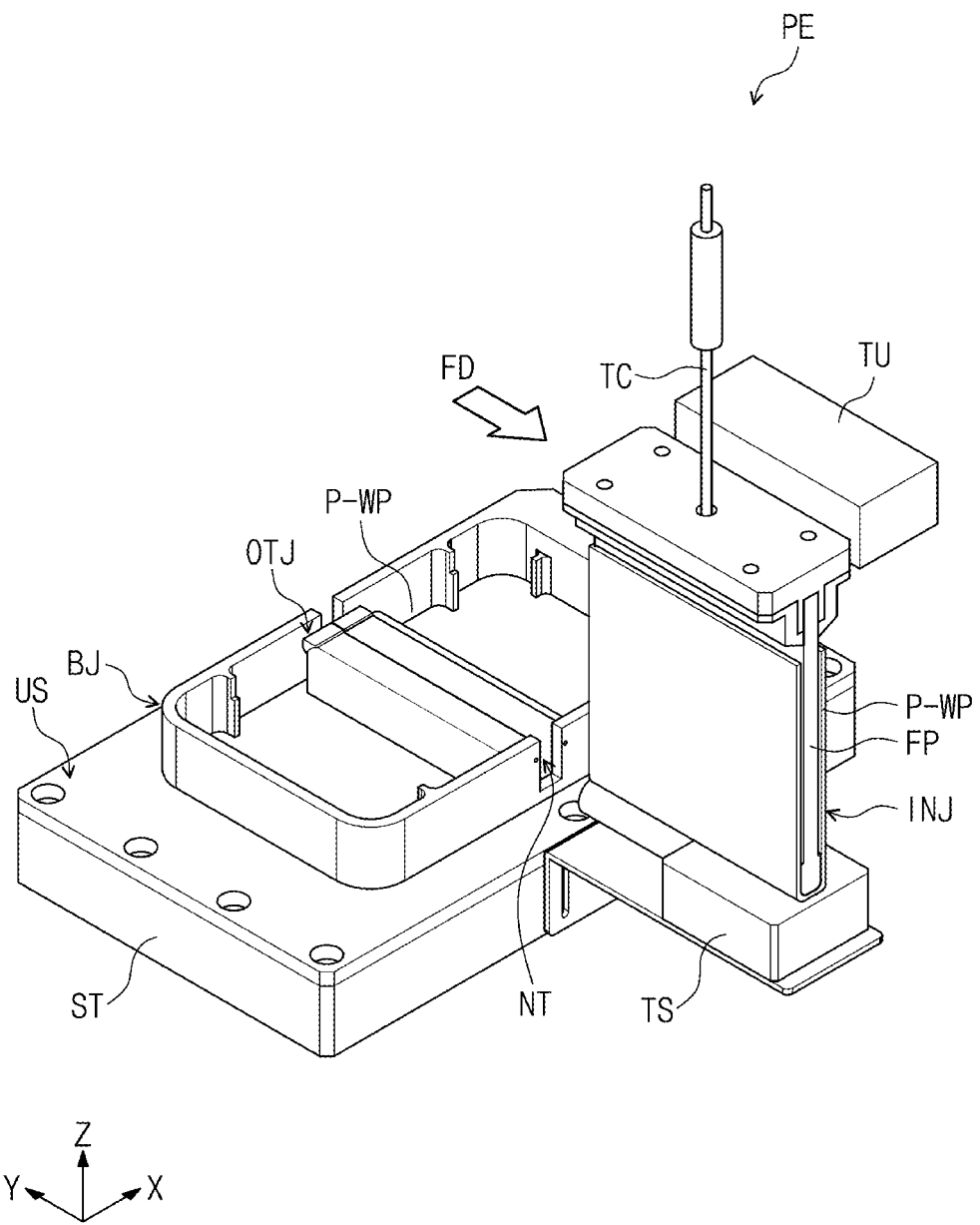
FIG. 26 is a view illustrating a portion of processes of the window molding method according to an embodiment.

FIG. 26 schematically illustrates a portion of the process (S500) of molding the processed member and also exemplarily illustrates a process of removing the inner molding part after bending the processed member. Referring to FIG. 26, the inner molding part INJ may be removed in the front direction FD of the window molding apparatus. Here, because a width of a notch NT of the base jig BJ is greater than a width of the inner molding part INJ, the inner molding part INJ may be removed through the notch NT.

Figure 27:
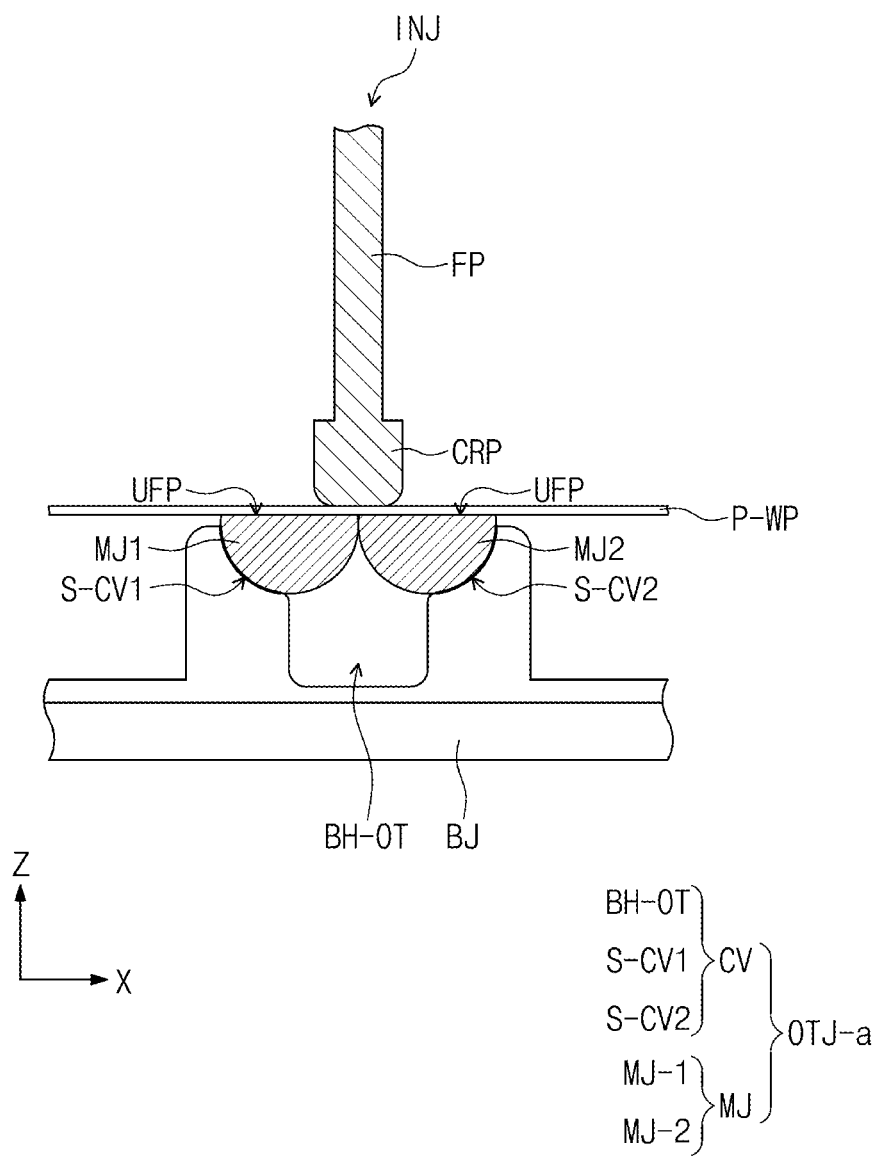
FIG. 27 is a view illustrating a portion of processes of the window molding method according to an embodiment.
Figure 28:
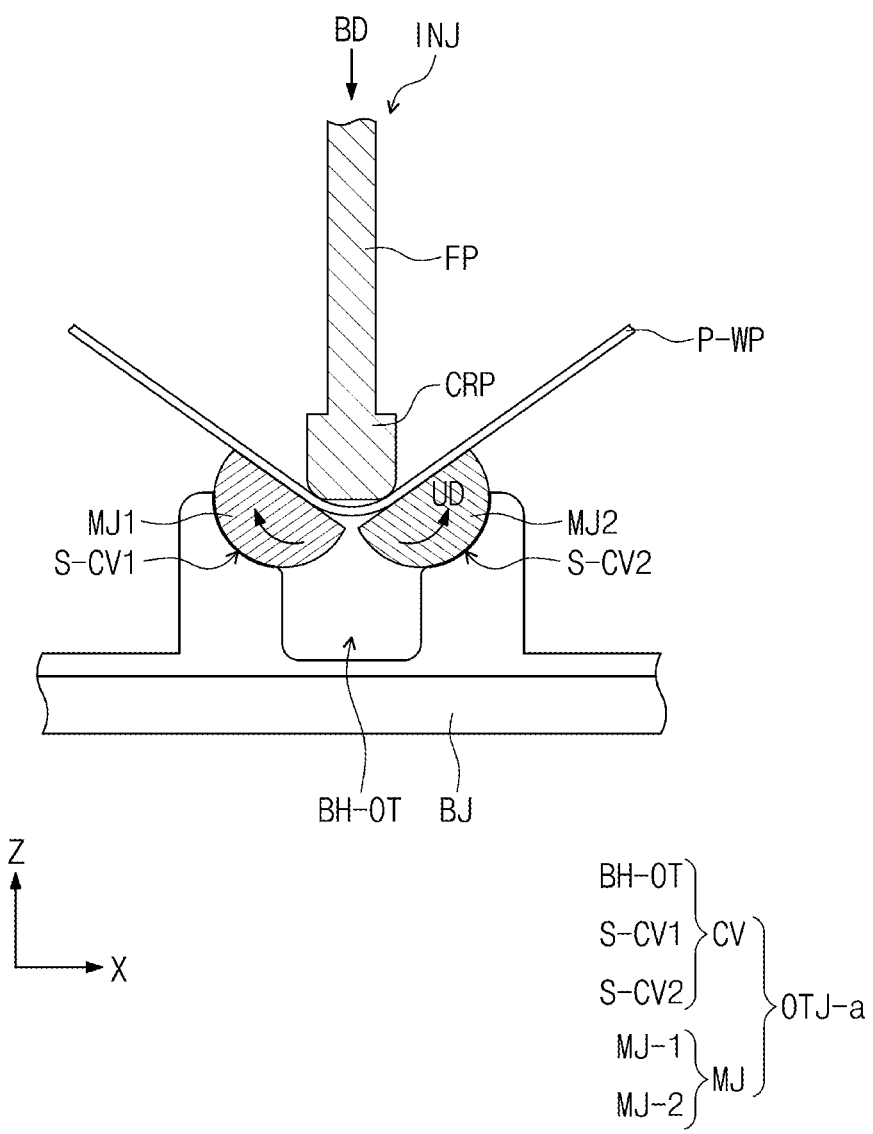
FIG. 28 is a view illustrating a portion of processes of the window molding method according to an embodiment.
Figure 29:
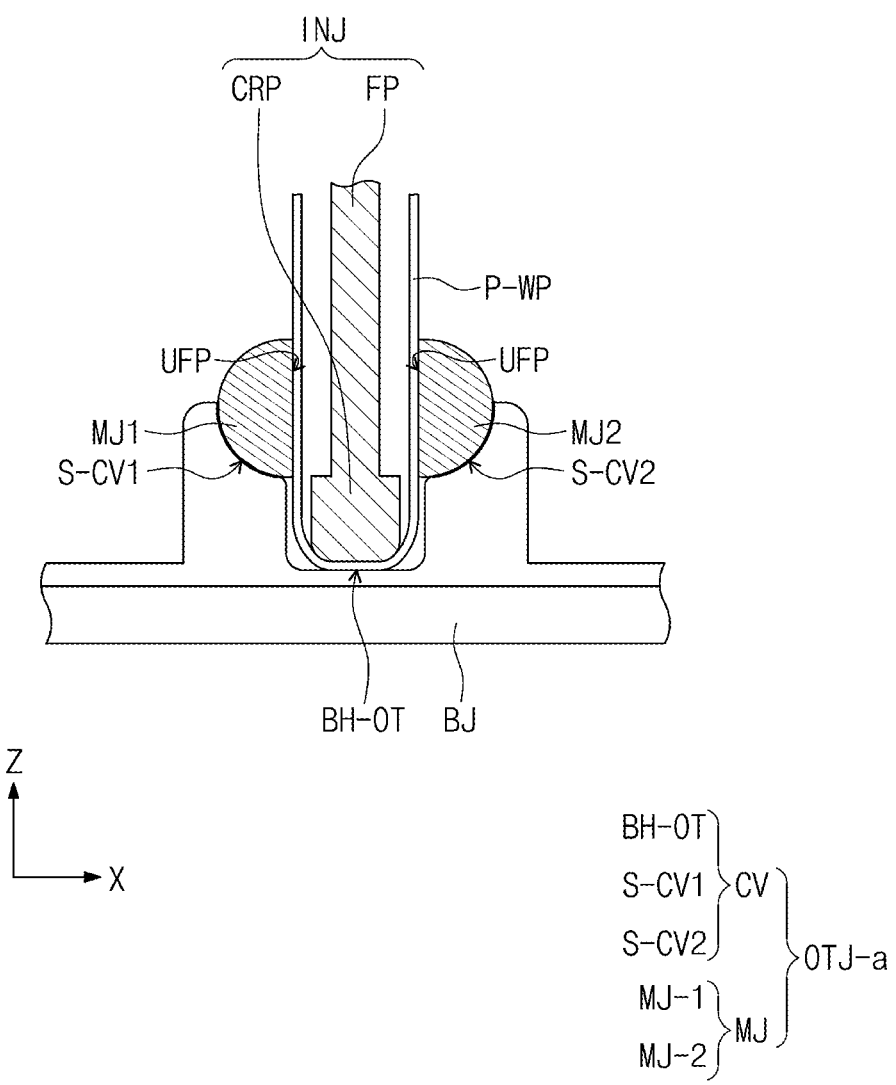
FIG. 29 is a view illustrating a portion of the processes of the window molding method according to an embodiment.

FIGS. 27 to 29 exemplarily illustrate processes of molding a window by using the window molding apparatus including the outer molding part OTJ-a described with reference to FIGS. 18 to 20.

FIG. 27 is a schematic view illustrating the process (S300) of disposing the processed member between the inner molding part and the inner molding part. The processed member P-WP may be disposed on movable molds MJ1 and MJ2 of the outer molding part OTJ-a.

The processed member P-WP may be disposed between the inner molding part INJ and the outer molding part OTJ-a in a flat state. In the process (S100) of disposing the processed member, flat mold parts UFP of the adjacent movable molds MJ1 and MJ2 may be arranged side by side to be adjacent to each other below the processed member P-WP.

After the processed member P-WP is disposed between the inner molding part INJ and the outer molding part OTJ-a, the processed member P-WP may be heated by heat provided through the core molding part CRP of the inner molding part INJ and the movable molds MJ1 and MJ2 of the outer molding part OTJ-a.

FIG. 28 is a view schematically illustrating a portion of the process (S500) of molding the processed member. FIG. 28 illustrates an intermediate process of being changed from a first state to a second state. Referring to FIG. 28, in the process (S500) of molding the processed member, the inner molding part INJ may move in a downward direction BD, which is a direction toward the outer molding part OTJ, and the movable molds MJ1 and MJ2 may move in a direction of rotating along curved surfaces of sub-cavities S-CV1 and S-CV2.

The inner molding part INJ may move in the downward direction BD by its own weight. As the inner molding part INJ moves, the processed member P-WP may be inserted between two adjacent movable molds MJ1 and MJ2 and then be bent. In an embodiment, the inner molding part INJ may be additionally pressed in addition to its own weight. That is, in the window molding method according to an embodiment, the inner molding part INJ may move in the downward direction BD by a pressure provided from a separate pressing member to bend the processed member P-WP.

FIG. 29 is a schematic view illustrating the process (S530) of bending the processed member. Referring to FIG. 29, in the process (S530) of bending the processed member, the inner molding part INJ may be inserted into a space defined by the movable molds MJ1 and MJ2 and the lower groove portion BH-OT with the processed member P-WP therebetween. In the process (S530) of bending the processed member, the flat mold parts UFP of the adjacent movable molds MJ1 and MJ2 may be spaced apart from each other to face each other with the processed member P-WP therebetween. In addition, the non-bent portions PP-1 and PP-2 (see FIG. 9A) of the processed member P-WP may face each other with the flat molding part FP of the inner molding part INJ therebetween.

After the process (S530) of bending the processed member, which is illustrated in FIG. 29, the inner molding part INJ may be removed to the front or rear direction of the window molding apparatus, like that illustrated in FIG. 26.

Referring to FIG. 21, the window molding method (S10) according to an embodiment may further include the process (S100) of molding an edge of the processed member. The process (S100) of molding the edge the processed member may be performed before the process (S300) of providing the processed member. The process (S100) of molding the edge of the processed member may be a process of processing the processed member to provide an edge portion P-ED (see FIG. 25) that is bent. The process (S100) of molding the edge of the processed member may be a process of thermally processing the processed member to provide an edge portion P-ED (see FIG. 25) that is bent. In the process (S100) of molding the edge of the processed member, the processed member may be processed to provide edge portions, like the window described with reference to FIGS. 6A to 6C.

Referring to FIG. 21, the window molding method (S10) according to an embodiment may further include the process (S700) of chemically strengthening the processed member. The process (S700) of chemically strengthening the processed member may be a process of chemically strengthening the processed member P-WP that is bent by being processed in strengthened molten salt through the window molding method according to the above-described embodiment. For example, the process (S700) of chemically strengthening the member to be processed may be performed in a temperature range of about 400° C. to about 500° C., but the embodiment is not limited thereto.

Also, the window molding method (S10) according to an embodiment may further include a process of polishing the member to be processed. The process of polishing the member to be processed may be performed after the process (S500) of molding the member to be processed. In the process of polishing the member to be processed, only the outer surface of the processed member may be polished. The outer surface WP-OS (see FIG. 2) of the window in which the polishing process is performed may have a surface roughness of about 3A to about 7A. Also, the inner surface WP-IS (see FIG. 2) of the window in which the polishing is not performed may have a surface roughness of about 3A or less.

The window molding method according to an embodiment may be used to manufacture the window including the bent portion bent at a large bending angle by being thermally molded using the window molding apparatus including the inner molding part and the outer molding part disposed below the inner molding part. Particularly, the window molding method according to an embodiment may be used to mold the window in which the bent portion has a variable curvature by using the window molding apparatus in which the core molding part of the inner molding part and the groove of the outer molding part include the curved surfaces having the different curvature radii. In addition, the window molding method according to an embodiment may be used to manufacture the window having excellent dimensional stability and improved surface quality by simultaneously molding the inside and the outside of the window using the window molding apparatus including the inner molding part and the outer molding part.

The window manufactured through the window molding apparatus and the window molding method according to an embodiment may include the bent portion that is bent at the large bending angle, and the bent portion may include the sub-bent portions having the different curvature radii to realize the improved grip and touch properties.

The window molding apparatus according to the embodiment may include the portions having the different curvature radii at the inner molding part and the outer molding part, which are disposed with the member to be processed therebetween so as to be used to manufacture the window having the bent portion including the portions having the different curvature radii.

The window having the bent portion bent at the large bending angle and the flat portions disposed with the bent portion therebetween may be manufactured by using the window molding method according to the embodiment.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A window molding apparatus comprising:
   an inner molding part having a core molding part and a flat molding part disposed on the core molding part; and
   an outer molding part which is disposed below the inner molding part with a member to be processed therebetween and in which a groove corresponding to the core molding part is defined,
   wherein the core molding part comprises:
   a first sub-bottom surface adjacent to the member, and the first sub-bottom surface is a flat surface; and
   a second sub-bottom surface connecting to the first sub-bottom surface, and the second sub-bottom surface is a curved surface which is bent with respect to a bending axis extending in a first direction;
   wherein the flat molding part is spaced apart from the first sub-bottom surface,
   wherein a width of the core molding part in a second direction is greater than that of the flat molding part in the second direction, and wherein the second direction is a direction perpendicular to the first direction,
   wherein the outer molding part comprises:
      a lower surface spaced apart from the core molding part;
      an upper surface facing the lower surface; and
      a plurality of sub-groove surfaces that define the groove,
   wherein the plurality of sub-groove surfaces comprise a first sub-groove surface including a flat surface corresponding to the first sub-bottom surface, and a second sub-groove surface including a curved surface corresponding to the second sub-bottom surface, and
   wherein the surface area of the flat molding part is greater than the surface area of the core molding part.

2. The window molding apparatus of claim 1, wherein the first sub-groove surface is adjacent to the lower surface, and the second sub-groove surface is adjacent to the first sub-groove surface and extends from the lower surface toward the upper surface.

3. The window molding apparatus of claim 1, wherein the member comprises:
   a bent portion bent with respect to the bending axis and first and second non-bent portions respectively disposed at both sides of the bent portion with the bent portion therebetween,
   wherein the bent portion comprises:
   a first sub-bent portion corresponding to the first sub-groove surface and the first sub-bottom surface and a second sub-bent portion corresponding to the second sub-groove surface and the second sub-bottom surface.

4. The window molding apparatus of claim 3, wherein the second sub-bent portion has a curvature radius less than that of the first sub-bent portion.

5. The window molding apparatus of claim 3, wherein the first sub-bent portion includes a flat surface, and
   the second sub-bent portion includes a curved surface having a curvature radius of about 4 mm or less.

6. The window molding apparatus of claim 3, wherein, in a state in which the core molding part and the member to be processed are inserted into the groove, the first non-bent portion and the second non-bent portion face each other with the flat molding part therebetween.

7. The window molding apparatus of claim 1, wherein the member comprises:
   an inner surface adjacent to the inner molding part and an outer surface configured to face the inner surface and adjacent to the outer molding part,
   wherein an edge portion of the member to be processed is bent toward the inner surface.

8. The window molding apparatus of claim 1, wherein the groove comprises:
   a lower groove portion defined by the first sub-groove surface and the second sub-groove surface; and
   a plurality of sub-cavities, which extends from the lower groove portion toward the upper surface, and each of which is defined to have a curved surface.

9. The window molding apparatus of claim 8, wherein the outer molding part further comprises:
   a plurality of movable molds respectively disposed on the sub-cavities to move along the curved surfaces of the sub-cavities.

10. The window molding apparatus of claim 9, wherein, in a cross-section perpendicular to the lower surface, each of the movable molds comprises:
    a curved mold part having a curved surface corresponding to the curved surface of each of the sub-cavities and a flat mold part configured to face the curved mold part.

11. The window molding apparatus of claim 1, further comprising a base jig on which the outer molding part is disposed,
    wherein the base jig includes a bottom surface and a plurality of side surfaces including a support portion on which the member to be processed is seated.

12. The window molding apparatus of claim 11, wherein a notch corresponding to the core molding part and is defined in at least one of the plurality of side surfaces.

* * * * *